US006788661B1

United States Patent
Ylitalo et al.

(10) Patent No.: US 6,788,661 B1
(45) Date of Patent: Sep. 7, 2004

(54) ADAPTIVE BEAM-TIME CODING METHOD AND APPARATUS

(75) Inventors: Juha Ylitalo, Oulu (FI); Marcos Katz, Oulu (FI)

(73) Assignee: Nikia Networks Oy (FI)

( * ) Notice: Subject to any disclaimer, the term of this patent is extended or adjusted under 35 U.S.C. 154(b) by 0 days.

(21) Appl. No.: 09/438,547

(22) Filed: Nov. 12, 1999

(51) Int. Cl.[7] .............................................. H04Q 7/00
(52) U.S. Cl. .................... 370/334; 455/127.2; 455/129; 455/272; 455/522; 455/562.1; 370/320; 342/359; 342/360; 342/373
(58) Field of Search ................................. 370/319–321, 370/322, 334–337; 455/562.1, 552, 522, 269, 272, 277.1, 101–104, 561, 107, 127.2; 342/91, 92, 117, 360, 359, 361, 367, 373

(56) References Cited

U.S. PATENT DOCUMENTS

| 4,596,986 | A | * | 6/1986 | Andrews et al. | ............ | 342/373 |
| 5,576,717 | A | * | 11/1996 | Searle et al. | ................ | 342/373 |
| 5,724,666 | A | * | 3/1998 | Dent | .......................... | 455/562 |
| 5,893,033 | A | * | 4/1999 | Keskitalo et al. | ........... | 455/437 |
| 6,108,323 | A | * | 8/2000 | Gray | .......................... | 370/335 |
| 6,108,565 | A | * | 8/2000 | Scherzer | .................... | 455/562 |
| 6,127,971 | A | * | 10/2000 | Calderbank et al. | ........ | 342/368 |
| 6,167,286 | A | * | 12/2000 | Ward et al. | .................. | 455/562 |
| 6,188,736 | B1 | * | 2/2001 | Lo et al. | ..................... | 375/347 |
| 6,205,337 | B1 | * | 3/2001 | Boch | .......................... | 455/447 |
| 6,353,638 | B1 | * | 3/2002 | Hottinen et al. | ............ | 375/260 |
| 6,421,543 | B1 | * | 7/2002 | Molnar | ....................... | 455/562 |
| 6,449,484 | B1 | * | 9/2002 | Grubeck et al. | ............ | 455/450 |

FOREIGN PATENT DOCUMENTS

| EP | 0 905 920 A | 3/1999 |
| WO | WO 98 09381 A | 3/1998 |
| WO | WO 98 27669 A | 6/1998 |
| WO | WO 00 36764 A | 6/2000 |

OTHER PUBLICATIONS

Heath, R. W., Jr. et al. "Multiple antenna arrays for transmitter diversity and space–time coding", 1999 Int'l. Conference on Communications (CAT. No. 99CH36311), 1999, Vancouver, BC, Canada Jun. 6–10, 1999, pp. 36–40.

Lo, T. et al. "Space–time block coding–from a physical perspective", WCNC. 1999 IEEE Wireless Communications and Networking Conference (CAT. No. 99$^{TH}$8466), New Orleans, LA, USA Sep. 21–24, 1999, pp. 150–153.

Sang–Bin Rhee, "Vehield Location In Angular Sectors Based On Signal Strength", IEEE Transaction On Vehicular Technology, vol. VT–27, No. 4, Nov. 1978, pp. 255–269.

Texas Instruments, "Space Time Block Coded Transmit Antenna Diversity For WCDMA", Oct. 30, 1998, pp. 1–4.

* cited by examiner

Primary Examiner—Charles Craver
(74) Attorney, Agent, or Firm—Banner & Wincoff, Ltd.

(57) ABSTRACT

A radio system includes a base station and a remote station. The base station includes a space-time encoder, an antenna system, a transmitter, a base station receiver, and a power management controller. The space-time encoder encodes a stream of symbols into first and second space-time coded signals, and the transmitter transmits the first and second space-time coded signals at respective first and second initial transmit powers from the antenna system so as to form respective first and second radiation patterns. The base station receiver receives power coefficient indicator information from the remote station, and the power management controller determines first and second adjusted transmit powers based on the respective first and second initial transmit powers and the power coefficient indicator information. In an alternative embodiment, a transmit station of a radio system includes a circuit to determine an angular power spectrum, a space-time encoder, and a transmitter. The space-time encoder encodes first and second symbols into first and second space-time coded signals, and the transmitter transmits the first and second space-time coded signals in respective first and second beams so that the first and second beams are contained within an angular spread of the angular power spectrum.

73 Claims, 16 Drawing Sheets

ADAPTIVE BEAM-TIME CODING METHOD AND APPARATUS

BACKGROUND OF THE INVENTION

1. Field of the Invention

The present invention relates to down link signal transmission from a base station of a cellular radio system to a remote station. In particular, the invention relates to adaptive control of multiple down link beams, beam powers and beam widths.

2. Description of Related Art

Cellular telephone systems are operated in environments that give rise to multi-path or reflections of the their signals, particularly in urban environments. In FIG. 1, base station transmitter 1 broadcasts its signal to remote station 2 (often mobile) along direct path 3. However, owing to the presence of tall building 4, transmitter 1 also broadcasts its signal to remote station 2 along indirect path 5, thus, giving rise to angular spread AS between the direction of arrival of direct path 3 at remote station 2 and the direction of arrival of indirect path 5 at remote station 2. Direct path 3 and indirect path 5 are recombined at remote station 2 where constructive and destructive superimposed signals cause random or what appears to be random fading and black out zones.

To reduce the effects of multi-path, known systems employ space time transmit diversity techniques. In FIG. 2, a known transmitter includes space time transmit diversity encoder 10, complex multipliers 12 and 14, and antennas 16 and 18. Space time transmit diversity encoder 10 processes input signal $S_{IN}$ into two channel signals $CH_1$ and $CH_2$. Multipliers 12 and 14 may impart a same orthogonalizing code OC on the two channel signals $CH_1$ and $CH_2$ to identify the two channels as containing information about input signal $S_{IN}$; however, different orthogonal identifiers (e.g., pilot sequences or training sequences) are applied to the different antenna signals so that the remote station can separately identify the signals from the two antennas. The multiplied channel signals are transmitted on respective antennas 16 and 18 substantially spaced apart by a distance (e.g., 20 wavelengths). Such spaced apart antennas are referred to as diversity antennas. In multi-path environments severe fading results when different propagation paths sum destructively at the receiving antenna. Using diversity antennas, the probability that both signals $CH_1$ and $CH_2$ will be in deep fade is low since the two signals are likely to propagate over different paths such as the multi-paths 3 and 5. Diversity antennas may be omni-directional antennas or antennas directed at antenna sectors with overlayed sectors. When diversity antennas are sufficiently separated in space, they can be regarded as orthogonal since they propagate signals in non-correlated channels (i.e., paths).

Input signal $S_{IN}$ carries two symbols, $S_1$ and $S_2$, in time succession, the first symbol in symbol slot between 0 and T, and the second symbol in symbol slot between T and 2T. In FIG. 3, exemplary encoder 10 uses a QPSK modulation technique and includes time align register 20 and hold registers 22 to hold the two symbols. Base band carrier signal SBBC is inverted in inverter 24 to produce negative base band carrier -SBBC. QPSK modulator 26 encodes symbol $S_1$ onto base band carrier signal SBBC to produce a modulated first symbol, and QPSK modulator 28 encodes symbol $S_1$ onto negative base band carrier signal –SBBC to produce a modulated conjugate of the first symbol. QPSK modulator 30 encodes symbol $S_2$ onto base band carrier signal SBBC to produce a modulated second symbol, and QPSK modulator 32 encodes symbol $S_2$ onto negative base band carrier signal –SBBC to produce a modulated conjugate of the second symbol. The modulated conjugate of the second symbol is inverted in inverter 34 to produce a negative modulated conjugate of the second symbol. Analog multiplexer 36 switches the modulated first symbol into the first channel signal during the first symbol time slot (i.e., 0 to T, FIG. 2) and switches the negative modulated conjugate of the second symbol into the first channel signal during the second symbol time slot (i.e., T to 2T, FIG. 2) so that the signal on CH1 is $[S_1, -S_2^*]$. Analog multiplexer 38 switches the modulated second symbol into the second channel signal during the first symbol time slot (i.e., 0 to T, FIG. 2) and switches the modulated conjugate of the first symbol into the second channel signal during the second symbol time slot (i.e., T to 2T, FIG. 2) so that the signal on CH2 is $[S_2, S_1^*]$.

In FIG. 2, code OC consists of one code applied to both multipliers 12, 14 that is used as a CDMA spreading function to isolate the two signals transmitted from antennas 16 and 18 from other signals that may generate co-channel interference. Multipliers 12 and 14, multiply the first and second channel signals before being transmitted through antennas 16 and 18. RF up converters are not shown for simplicity.

At remote station 2, a receiver receives signals from both antennas 16 and 18 on a single antenna, down-converts the signals, despreads the signals using code OC, and recovers a composite of channels CH1 and CH2 as transmitted from antennas 16 and 18, respectively. In the first symbol time slot between 0 and T, the composite QPSK modulated signal $R_1$ is received (where $R_1 = k_{11}S_1 + k_{12}S_2$), and in the second symbol time slot between T and 2T, the composite QPSK modulated signal $R_2$ is received (where $R_2 = -k_{21}S_2^* + k_{22}S_1^*$ and the asterisk refers to a complex conjugate). Constant $k_{11}$ is a transmission path constant from first antenna 16 to remote station 2 during the first time slot, constant $k_{12}$ is a transmission path constant from second antenna 18 to remote station 2 during the first time slot, constant $k_{21}$ is a transmission path constant from first antenna 16 to remote station 2 during the second time slot, and constant $k_{22}$ is a transmission path constant from second antenna 18 to remote station 2 during the second time slot. The receiver derotates the channel to recover soft symbols $S_1'$ and $S_2'$, where $$S_1' = k_{11}R_1 + k_{12}R_2 \text{ and } S_2' = k_{21}R_2^* + k_{22}R_1^*.$$

In this time space encoder technique, the first and second symbols are redundantly transmitted from separate antennas. The first symbol is encoded to be transmitted in both the first and second symbol time slots, and the second symbol is also encoded to be transmitted in both the first and second symbol time slots. The effect of this symbol recovery technique is that fading or drop out regions that may appear during one symbol time slot are less likely to appear during both symbol time slots when interleaving is also exploited. Interleaving is used before space-time coding to make adjacent bits less correlated in time. Since the received symbols are recovered from received signals during both time slots, $R_1$ and $R_2$, the effect of fading is diminished.

However, the prior art does not exploit advantages provided by independent power management of individual beams transmitted by different diversity type antennas to achieve greater spectral efficiency at the base station while minimizing co-channel interference. The prior art does not exploit advantages provided by spatial power or beam width management of independently directed beams to achieve greater spectral efficiency at the base station while minimizing co-channel interference. The prior art does not exploit advantages provided by angle of arrival diversity to achieve greater spectral efficiency at the base station while minimizing co-channel interference.

SUMMARY OF THE INVENTION

It is an object to the present invention to improve the spectral efficiency of transmissions from the base station. It is another object of the present invention to minimize co-channel interference. It is a further object to minimize undesired effects of fading and drop out.

These and other objects are achieved in a system that includes a base station and a remote station. The base station includes a space-time encoder, an antenna system, a transmitter, a base station receiver, and a power management controller. The space-time encoder encodes a stream of symbols into first and second space-time coded signals, and the transmitter transmits the first and second space-time coded signals at respective first and second initial transmit powers from the antenna system so as to form respective first and second radiation patterns. The base station receiver receives power coefficient indicator information from the remote station, and the power management controller determines first and second adjusted transmit powers based on the respective first and second initial transmit powers and the power coefficient indicator information.

In an alternative embodiment, a transmit station of a radio system includes a circuit to determine an angular power spectrum, a space-time encoder, and a transmitter. The space-time encoder encodes first and second symbols into first and second space-time coded signals, and the transmitter transmits the first and second space-time coded signals in respective first and second beams so that the first and second beams are contained within an angular spread of the angular power spectrum.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

To achieve greater spectral efficiency of transmissions from the base station while minimizing co-channel interference, independent power management of individual beams transmitted by different antennas of the diversity antennas has been developed, and beamspace time encoder techniques has been developed to exploit angle of arrival diversity and exploit spatial power management of independently directed beams. Beamspace time techniques differ from known space time encoder techniques by its use of two or more independently directed orthogonal beams to exploit power and beam width management and angle of arrival diversity. Orthogonal beams are separately identifiable to the receiver by using perpendicular polarization (two beam case), by using a different pilot code for each beam in a CDMA system in addition to the CDMA spread spectrum code that is common to all beams, by using a different spread spectrum code for each beam in a CDMA system without pilot codes, by using a different training sequence (e.g., pilot code) multiplexed into each beam in a TDMA system. Persons skilled in the art will appreciate that there are other orthogonal beam techniques not listed above or techniques that use different combinations of the above techniques that are equivalent for providing a means for the receiver at the remote station to separately identify the individual beams and recover the signals they carry.

Power management techniques to transmit different powers in different orthogonal beams improve spectral efficiency at the base station on a system wide basis by minimizing co-channel interference even when this power management control is applied to overlaid sector directed beams or omni directional beams of diversity antennas. However, with orthogonally coded beams that are directed differently, spatial power management of independently directed beams provides even further improvements. The relatively poor downlink performance of radio environments with large angular spreads is significantly improved by applying the beamspace time encoder techniques described herein.

Figure 4:
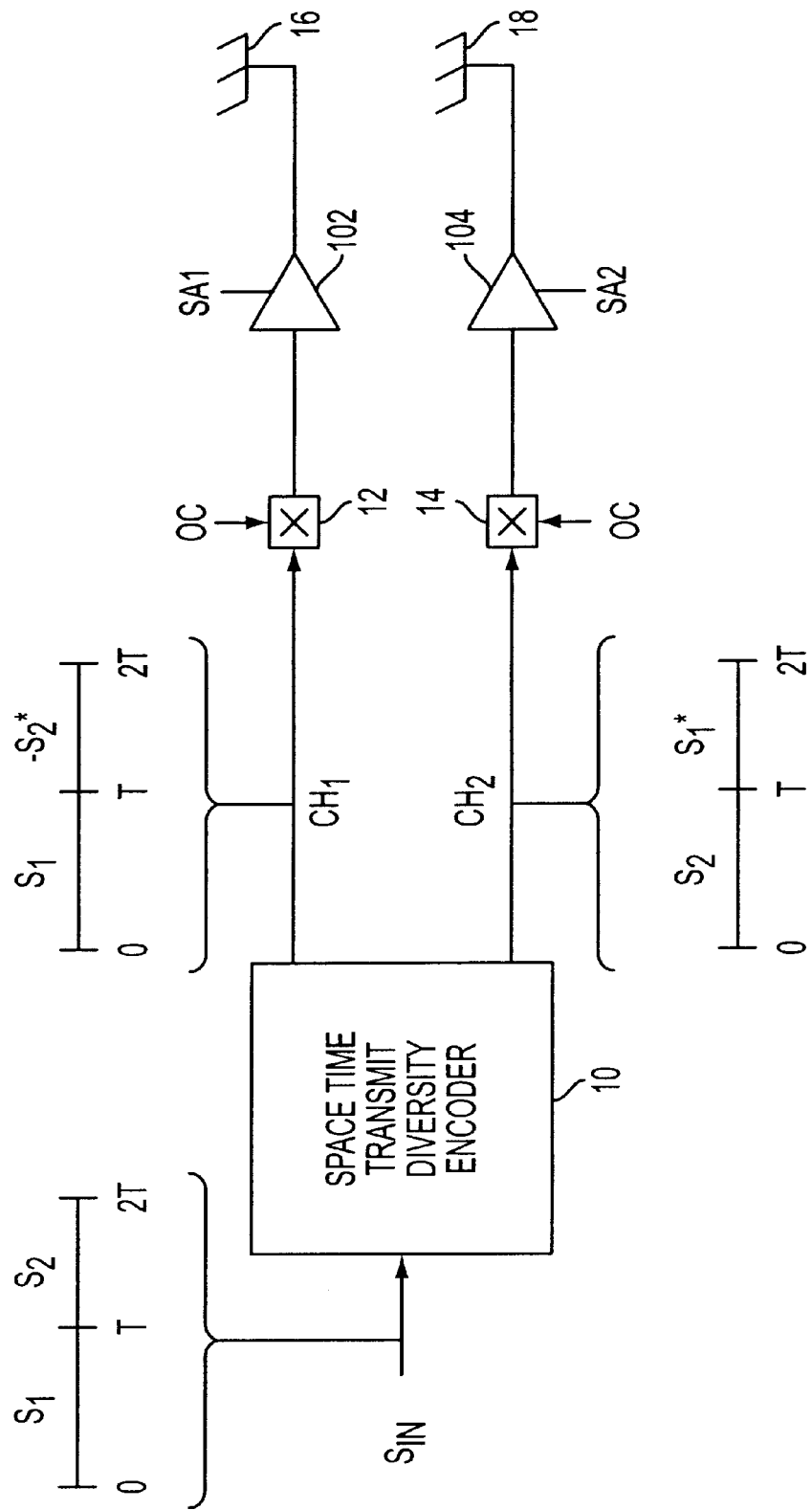
FIG. 4 is a block diagram of a base station apparatus according to an embodiment of the present invention.

In FIG. 4, a first embodiment of an improved transmitter 100 (referred to as power management of diversity antennas) includes known space time transmit diversity encoder 10 and complex multipliers 12 and 14. Improved transmitter 100 further includes scaling amplifiers 102 and 104 and diverse antennas 16 and 18. In a CDMA system, multipliers 12, 14 impart different spread spectrum codes to different beams so that a receiver at remote station 2 can discern the beams separately.

Although separate distinguishable spreading codes in a CDMA system are applied to multipliers 12, 14 as described here to create the orthogonal beams, it will be appreciated that any means to create orthogonal beams enable the separate power management of the transmissions from the diversity antennas (i.e., overlaid coverage), or from controllable directional antennas for that matter. For example, in a CDMA system where the multipliers 12 and 14 are provided with the same spreading codes, another set of multipliers 12' and 14' (not shown) may be used for imparting pilot codes to the channel signals. Multipliers 12' and 14' are then provided with orthogonal pilot codes so the receiver in remote station 2 can separately discern the beams. In another variant, antennas 16 and 18 are constituted by a single antenna with two exciter elements arranged to generate two beams that are orthogonally polarized (e.g., polarized at a +/−45 degree slant to the vertical or some other reference), but otherwise cover the same sector. Such beams are orthogonal, and transmissions over the respective signal paths experience uncorrelated fading.

Scaling control signals SA1 and SA2 separately control the amplification or attenuation achieved by separate scaling amplifiers 102 and 104, respectively. Scaling control signals SA1 and SA2 may be real to scale amplitudes, or imaginary to shift phases or complex with both real and imaginary components to both scale amplitudes and shift phases. It will be appreciated that the amplification may be applied at the output of encoder 10, before multipliers 12 and 14, after multipliers 12 and 14 or in antennas 16 and 18.

Antennas 16, 18 are diversity antennas that cover overlaid sectors or are omni-directional. This first embodiment differs from known space-time coded systems in that the power transmitted in each beam is separately controlled by SA1 and SA2.

Figure 5:
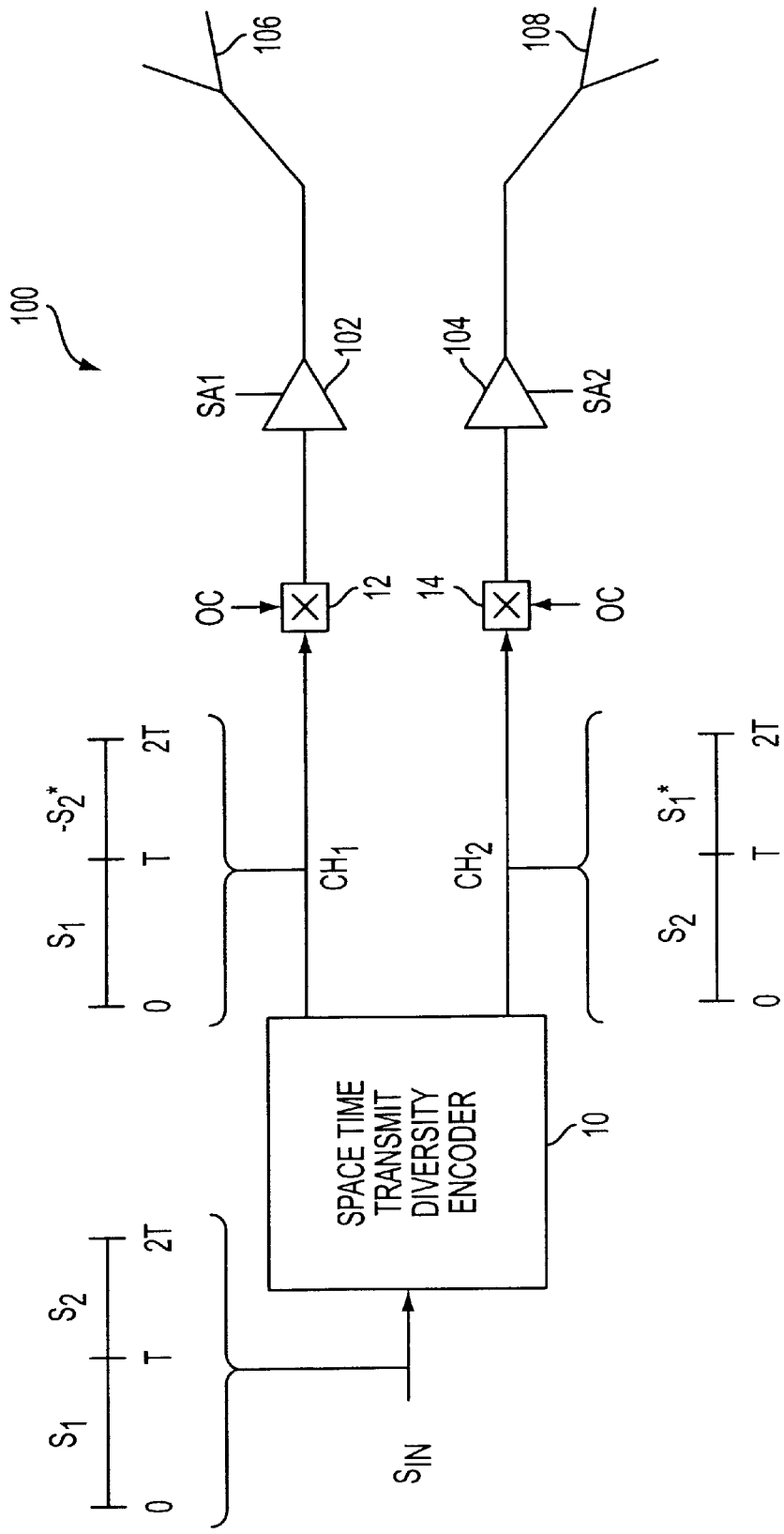
FIG. 5 is a block diagram of a base station apparatus according to another embodiment of the present invention.

In FIG. 5, a second embodiment of an improved transmitter 100 (referred to as angular spectral power management) includes known space time transmit diversity encoder 10 and complex multipliers 12 and 14. Improved transmitter 100 further includes scaling amplifiers 102 and 104 and controlled directional antennas 106 and 108. Unlike antennas 16 and 18 of FIG. 2, directional antennas 106 and 108 are directed toward direct path 3 and indirect path 5 (FIG. 1) or some other direction to cover angular spread AS or that portion of the angular power spectrum that exceeds a threshold as described herein. In a CDMA system, multipliers 12, 14 impart different spread spectrum codes to different beams or use other means so that a receiver at remote station 2 can discern the beams separately as described for the first embodiment using diversity antennas. Scaling control signals SA1 and SA2 separately control the amplification or attenuation achieved by separate scaling amplifiers 102 and 104, respectively. Scaling control signals SA1 and SA2 may be real to scale amplitudes, or imaginary to shift phases or complex with both real and imaginary components to both scale amplitudes and shift phases. It will be appreciated that the amplification may be applied at the output of encoder 10, before multipliers 12 and 14, after multipliers 12 and 14 or in antennas 106 and 108. Although separate spreading codes in a CDMA system are applied to multipliers 12, 14 as described here to create the orthogonal beams, it will be appreciated that any means to create orthogonal beams enable the separate power management of the transmissions from the controlled directional antennas (i.e., directions selected as described herein).

In a third embodiment (referred to as directional diversity and not separately shown), amplifiers 102 and 104 of FIG. 5 are removed from transmitter 100 so that no differential amplification is achieved, and both channels CH1 and CH2 have balanced and equal amplification, but their signals are transmitted directionally through controlled directional antennas 106 and 108.

Figure 6:
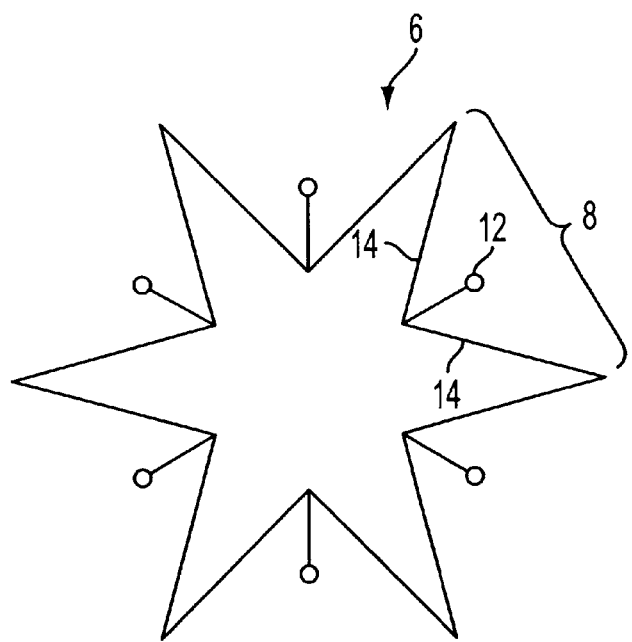
FIG. 6 is a schematic diagram of a known hex corner reflector antenna system.

There are several means to implement controlled directional antennas. In FIG. 6, known hex controlled directional antenna system 6 includes six co-sited corner reflector antennas, such as corner reflector antenna 8, arranged in a circle and all depicted in plan view. Each corner reflector antenna 8 includes a single half wave dipole 12 as an exciter element and corner reflectors 14. Each corner reflector antenna 8 illuminates a 60 degree beam width in plan view. Hex diversity antenna system 6 has been shown to provide angle location information that gives the bearing angle from a base station to the remote station based on received signal strength at 820 MHz (Rhee, Sang-Bin, "Vehicle Location In Angular Sectors Based On Signal Strength", *IEEE Trans. Veh. Technol.*, vol. VT-27, pp 244–258, Nov. 1978). Such co-sited corner reflector antennas could divide a 360 degree coverage into three sectors (120 degree antennas), four sectors (90 degree antennas), five sectors (72 degree antennas), eight sectors (45 degree antennas); or any convenient number of sectors that may be realizable.

Figure 1:
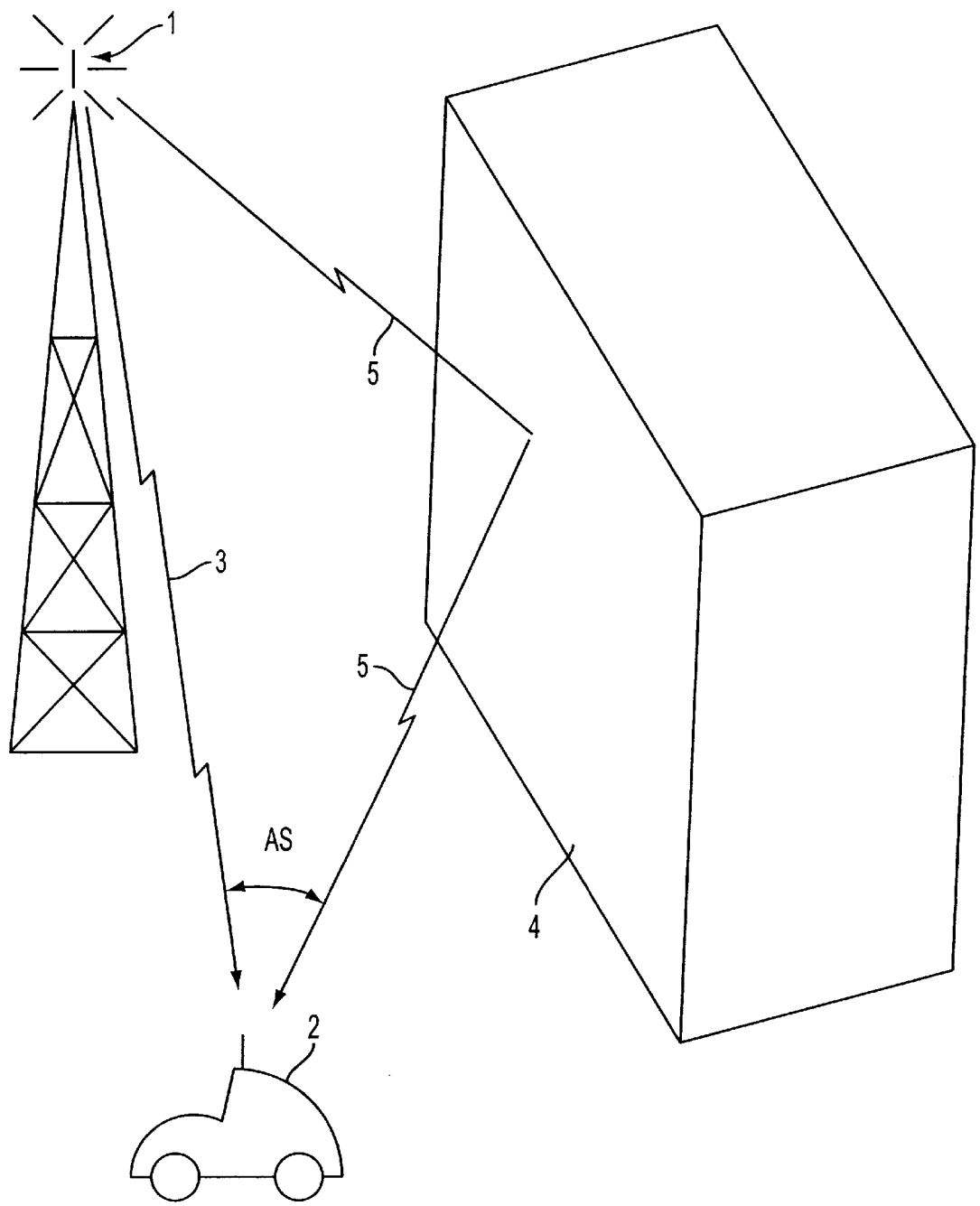
FIG. 1 is a schematic view of the radio environment in which the present invention is employed.
Figure 2:
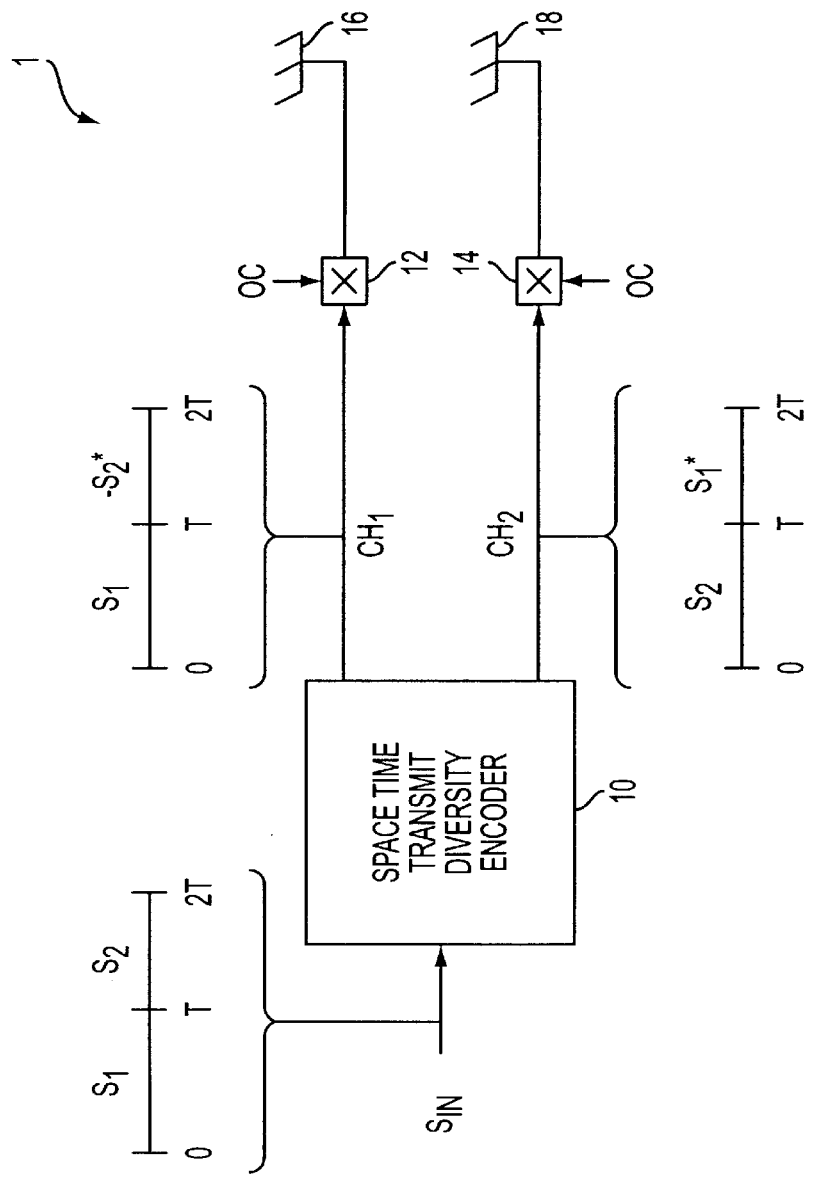
FIG. 2 is a block diagram of a known base station.
Figure 3:
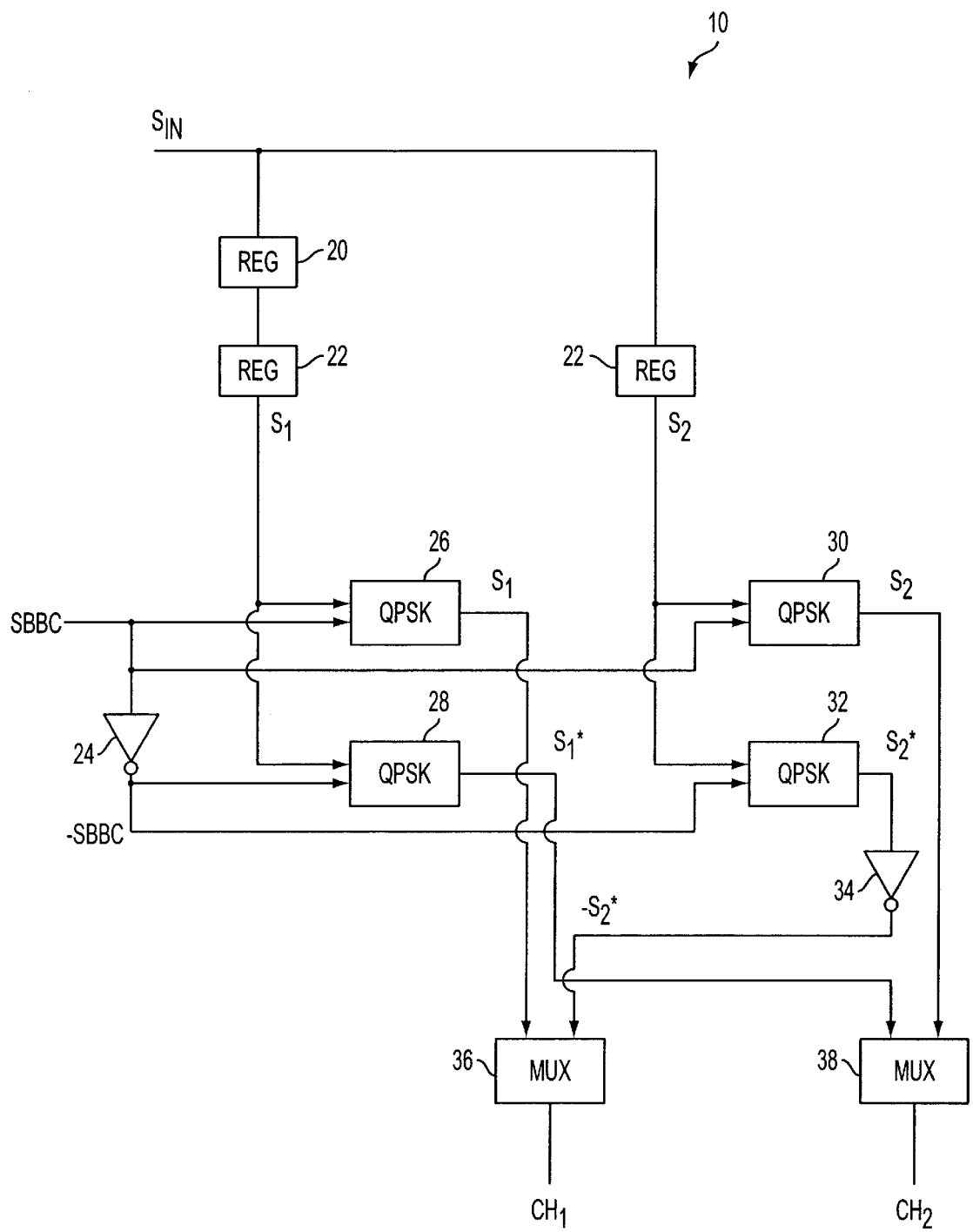
FIG. 3 is a block diagram of a known space time encoder.

In the second and third embodiments of the present invention, a controlled directional antenna system is used for cellular radio transmitter 1 (FIG. 1). A controlled directional antenna system is defined as being capable of providing two or more distinguishable and separately controllable beams. It may be a single antenna with two or more exciter elements arranged to generate two or more beams (e.g., arranged to generate two discernable beams respectively polarized at a +/−45 degree slant to the vertical, but otherwise cover the same sector). It may be a multi-antenna system to generate beams that cover different sectors. For example, the controlled directional antenna system may advantageously be a hex corner reflector system, such as the antenna system depicted in FIG. 6. The controlled directional antenna system is used in a receive mode to determine the angle location of remote station 2 based on a signal transmitted from remote station 2. The two sectors with the strongest received signals are identified as the likely direction of arrival of direct path 3 and indirect path 5 (see FIG. 1). The antennas illuminating these two sectors are selected to be directional antennas 106 and 108 of the second and third embodiments of the present invention (FIGS. 4 and 5). Alternatively, the respective directions of arrival may be determined based on a calculation of the angular power spectrum as discussed below.

Figure 7:
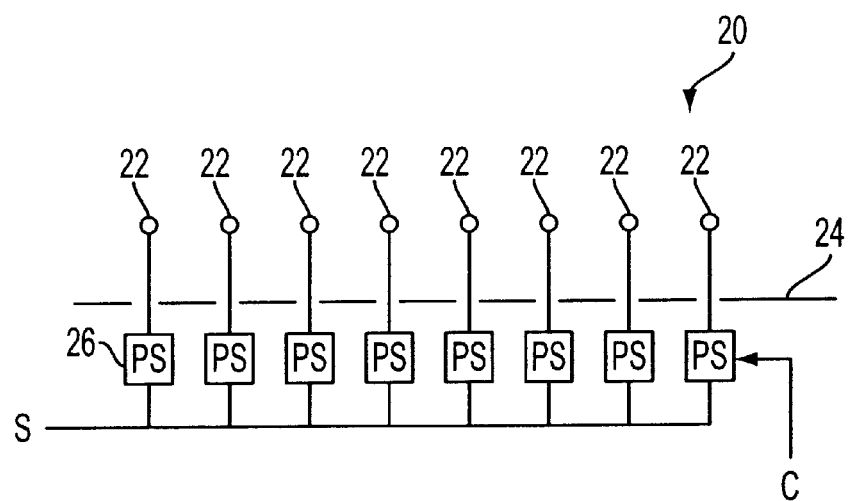
FIG. 7 is a schematic diagram of a known phase array antenna.

In FIG. 7, known stearable beam phased array antenna 20 includes an array of exciter elements 22 (e.g., half wave dipole) disposed to be spaced from ground plane or reflector plane 24. FIG. 7 depicts eight radiating elements, but more or fewer elements may be used. Each exciter element 22 is fed with a signal from a corresponding phase shifter 26. Each phase shifter 26 alters the phase and attenuates (or amplifies) the amplitude of signal S according to a corresponding individual control portion of control signal C. For example, control signal C includes 8 phase shift parameters and 8 attenuation parameters. Each phase and amplitude parameter individually controls the phase and amplitude radiated from a corresponding element of the eight exciter elements of antenna 20. The angular beam width of such an antenna is limited by the ratio of the wavelength of the signal being radiated divided by the aperture dimension D; however, by controlling signal amplitudes on exciter elements 22 as distributed across the antenna with what is called a weighting function, the beam may be shaped to broaden the beam, flatten the center of the beam and/or suppress side lobes. By controlling the gradient of the phase at the exciter elements across the antenna, the beam may be electronically directed to point in a controlled direction.

Figure 8:
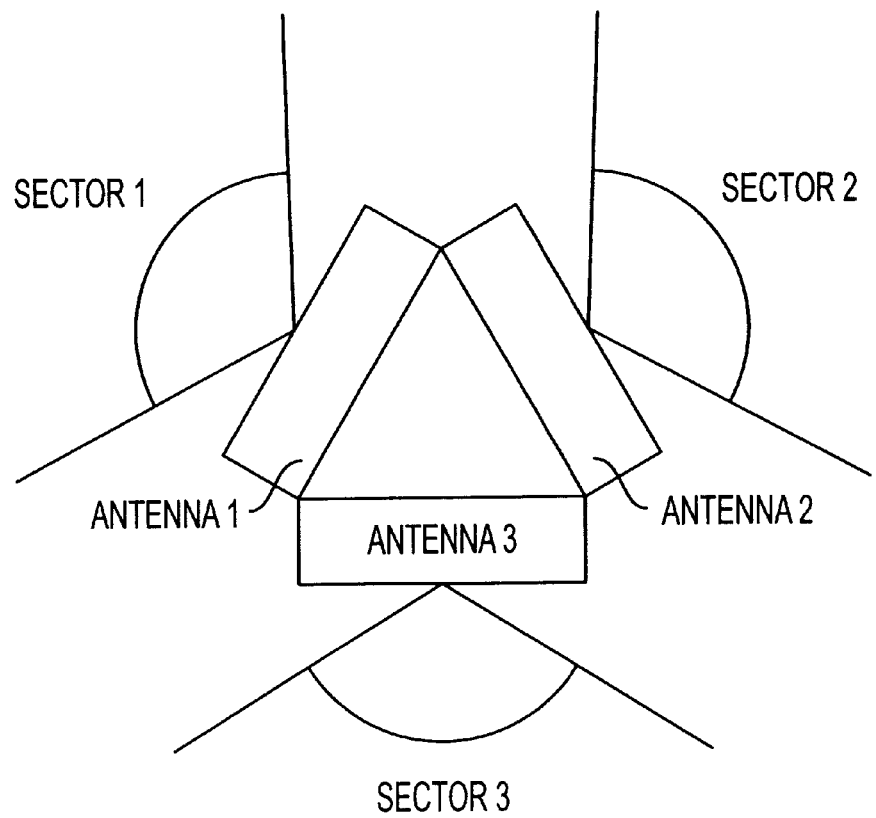
FIG. 8 is a schematic diagram in plan view of an exemplary three sector antenna system.

In a variant of the second and third embodiments, the antenna system for transmitter 1 (FIG. 1) includes plural phased array antennas 20 organized in a multi-antenna system. In FIG. 8, an exemplary multi-antenna system may include three antennas (taken to be phased array antennas 20) arranged to point outward in equally spaced angular direction so that the three phased array antennas 20 are formed into the antenna system at the base station. Each antenna 20 is designed to cover a 120 degree sector. The base station locates the remote station by electronically scanning antenna 20. Amplitude weights for each radiating element are preferably set to a maximum and are all equal so that the antenna provides its narrowest beam (most directional beam). The receive beam is scanned in steps by first computing the phase parameters for control signal C that represent a gradient in phase across the antenna to achieve a desired beam point, and then controlling antenna 20 to point in the desired direction. Second, a receiver at transmitter 1 (FIG. 1) detects any received signal strength. The steps of pointing a receive beam and detecting a signal strength are repeated at each of several beam positions until the entire sector covered by antenna 20 has been scanned. In this way, the angle location of remote station 2 is determined to a precision limited only by the narrowest achievable beam width of antenna 20. Once the location of direct path 3 and indirect path 5 are determined to be in different sectors (e.g., 120 degree sectors), antennas 106 and 108 (FIG. 5) are selected from the plural antennas 20 of the antenna system that are closest to direct path 3 and indirect path 5, and within the sector covered by each selected antenna 20, the phase gradients that define beams pointing at the angle locations for direct path 3 and for indirect path 5 are determined. Alternatively, when paths 3 and 5 lie in a single sector, two transmitting beams can be formed within the single sector to be directed along paths 3 and 5 if the antenna system is capable of forming the two beams in the single sector (see discussion below with respect to FIG. 10).

Figure 9:
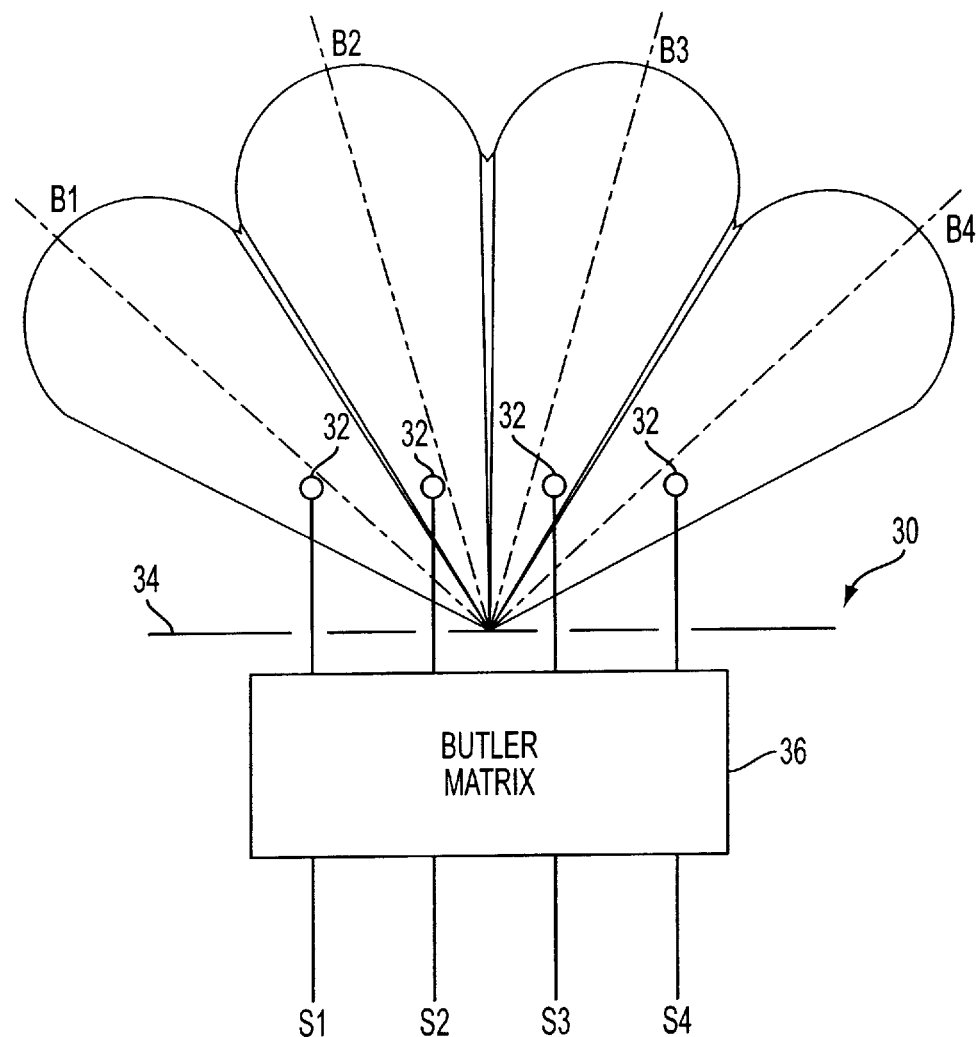
FIG. 9 is a schematic diagram of a known "Butler matrix" antenna.

In FIG. 9, antenna system 30 includes four radiating elements 32 disposed to be spaced from ground plane or reflector plane 34. Each radiation or exciter element 32 is fed with a signal from known Butler matrix 36. The Butler matrix provides phase shifting and combination functions that operate on signals S1, S2, S3 and S4 so that the radiation from the four exciter elements 32 combine to generate four fixed angularly directed and orthogonal beams B1, B2, B3 and B4. In general, a Butler matrix performs a Fourier processing function to feed M radiating elements so as to form M fixed and orthogonal beams ("angular bins"). For example, in antenna system 30, signal S1 is transmitted only in first beam B1, signal S2 is transmitted only in second beam B2, signal S3 is transmitted only in third beam B4, and signal S4 is transmitted only in fourth beam B4. A switching matrix may be used to direct desired signals (e.g., the signals CH1 and CH2 of FIG. 5) onto any of the lines for signals S1, S2, S3, and S4 and from there into respective beams B1, B2, B3 and B4.

In a variant of the second and third embodiments, the antenna system for transmitter 1 (FIG. 1) includes plural "Butler matrix" antennas 30 organized in a multi-antenna system. In FIG. 8, an exemplary multi-antenna system includes three antennas (taken here to be "Butler matrix" antennas 30) arranged to point outward in equally spaced angular direction so that the three "Butler matrix" antennas 30 are formed into the antenna system at the base station. Each antenna 30 is designed to cover a 120 degree sector with, for example, four beams. The base station locates the remote station by electronically switching between the four beams (each 30 degrees) of each of the three antennas 30 and detecting the signal strength received. In this way, the angle location of remote station 2 is determined to a precision of one beam width of antenna 30. Once the locations of direct path 3 and indirect path 5 are determined, antennas 106 and 108 (FIG. 5) are selected from the two different "Butler matrix" antennas 30 that make up the antenna system for transmitter 1 (FIG. 1) if direct path 3 and indirect path 5 lie in different sectors. The two particular "Butler matrix" antennas 30 are selected to cover the sectors that are closest to direct path 3 and indirect path 5, and from there, a particular beam within each selected antenna 30 is selected that most closely aligns with the path. Alternatively, antennas 106 and 108 may be selected to be different beams of the same "Butler matrix" antenna 30. Within the sector covered by each antenna 30, the beam pointing at the angle location for each of direct path 3 and indirect path 5 is selected by a switch matrix (not shown).

Figure 10:
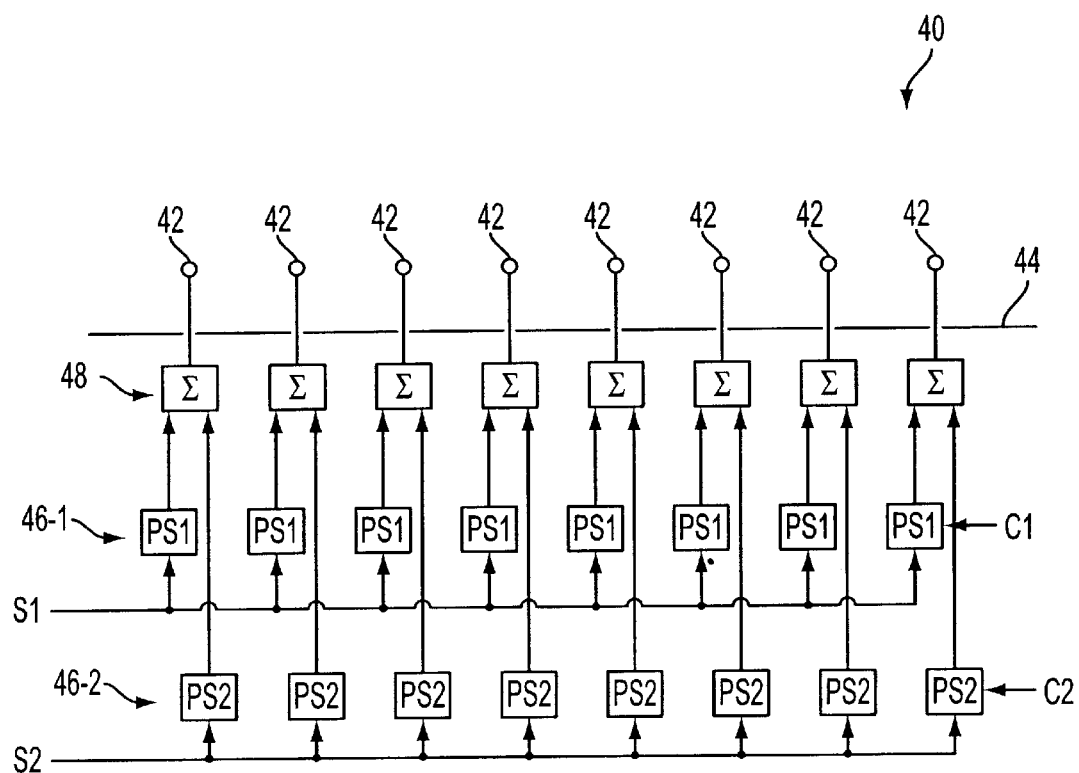
FIG. 10 is a schematic diagram of a dual beam phase array antenna.

In FIG. 10, antenna 40 is a modified version of phased array antenna 20 to provide two independently steerable and shapable beams. Antenna 40 includes an array of exciter elements 42 (e.g., half wave dipole) disposed to be spaced from ground plane or reflector plane 44. FIG. 10 depicts eight radiating elements, but more or fewer elements may be used. However, unlike antenna 20, each exciter element in antenna 40 is fed by a signal from a corresponding summer 48. Each summer 48 superimposes (e.g., adds) signals from two corresponding phase shifters 46-1 and 46-2. All phase shifters 46-1 form a first bank of phase shifters, and all phase shifters 46-2 form a second bank of phase shifters. Each phase shifter 46-1 in the first bank alters the phase and attenuates (or amplifies) the amplitude of signal S1 according to a corresponding individual control portion of control signal C1. For example, control signal C1 includes 8 phase shift parameters and 8 attenuation parameters to individually control the phase and amplitude output from the corresponding phase shifter 46-1. Correspondingly, each phase shifter 46-2 in the second bank alters the phase and attenuates (or amplifies) the amplitude of signal S2 according to a corresponding individual control portion of control signal C2. For example, control signal C2 includes 8 phase shift parameters and 8 attenuation parameters to individually control the phase and amplitude output from the corresponding phase shifter 46-2. Summers 48 combine the outputs of respective phase shifters 46-1 and 46-2 and provide the combined signal to radiating elements 42. In this way, control signal C1 controls a first beam that radiates signal S1, and control signal C2 simultaneously controls a second beam that radiates signal S2.

In a variant of the second and third embodiments, the antenna system for transmitter 1 (FIG. 1) includes plural phased array antennas 40 organized in a multi-antenna system. In FIG. 8, an exemplary multi-antenna system includes three antennas (taken here to be phased array antennas 40) arranged to point outward in equally spaced angular direction so that the three phased array antennas 40 are formed into the antenna system at the base station. Each antenna 40 is designed to cover a 120 degree sector with two independently shapable and steerable beams. The base station locates the remote station by electronically scanning a beam of antenna 40 as discussed above with respect to antenna 20 (FIG. 7). Once the location of direct path 3 and indirect path 5 are determined, antennas 106 and 108 (FIG. 5) are selected from the plural antennas 40 of the antenna system that are closest to direct path 3 and indirect path 5, and within the sector covered by each selected antenna 40, the phase gradients that define beams pointing at the angle location for direct path 3 and for indirect path 5 are determined.

Alternatively, antennas 106 and 108 may be selected to be different beams of the same dual beam antenna 40. In FIG.

11, antennas 106 and 108 (FIG. 5) are implemented in separate beams (i.e., beams 1 and 2) of dual beam antenna 40, and scaling amplifiers 102 and 104 (of FIG. 5) are not needed since the scaling function may be achieved by scaling the amplitude coefficients of control signals C1 and C2 (FIG. 10).

Figure 11:
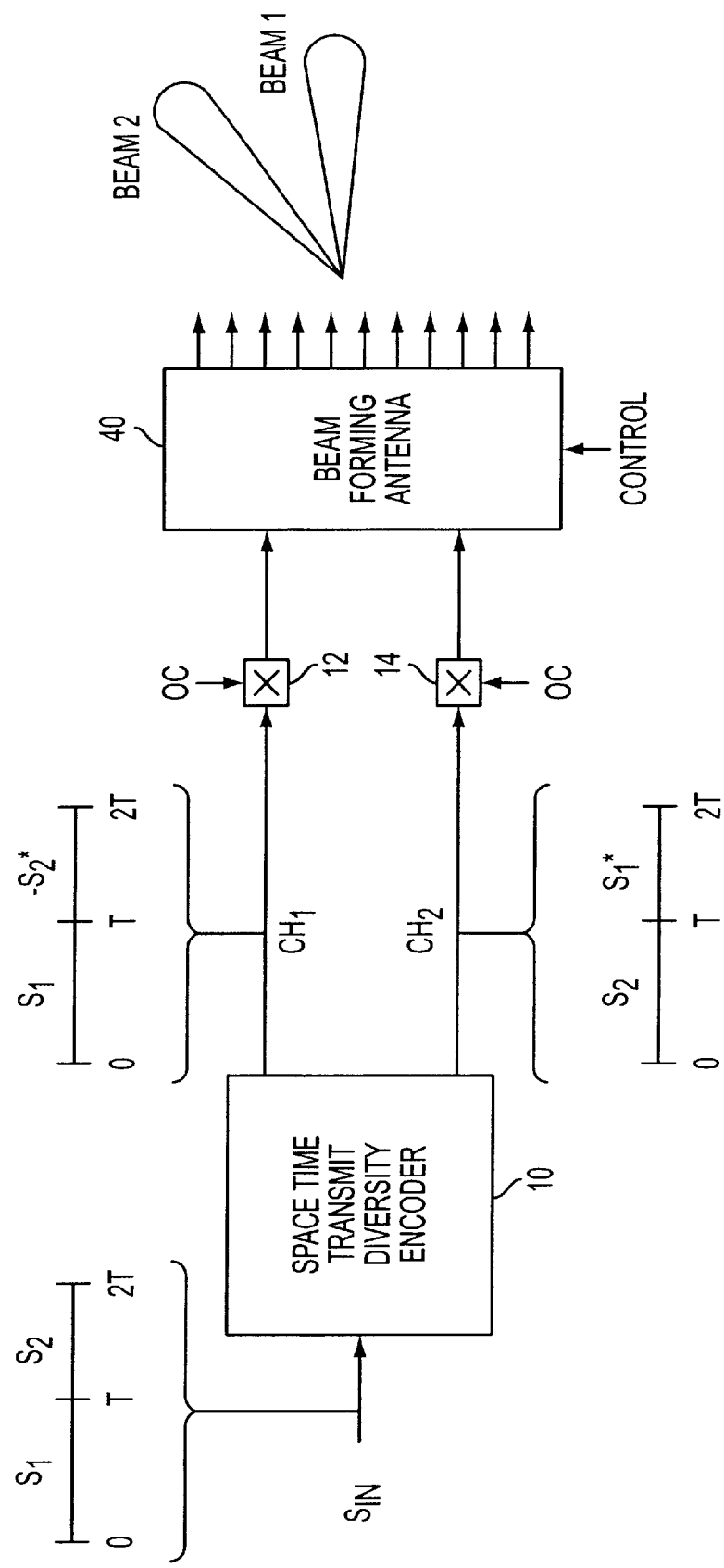
FIG. 11 is a block diagram of a base station apparatus according to another embodiment of the present invention.
Figure 12:
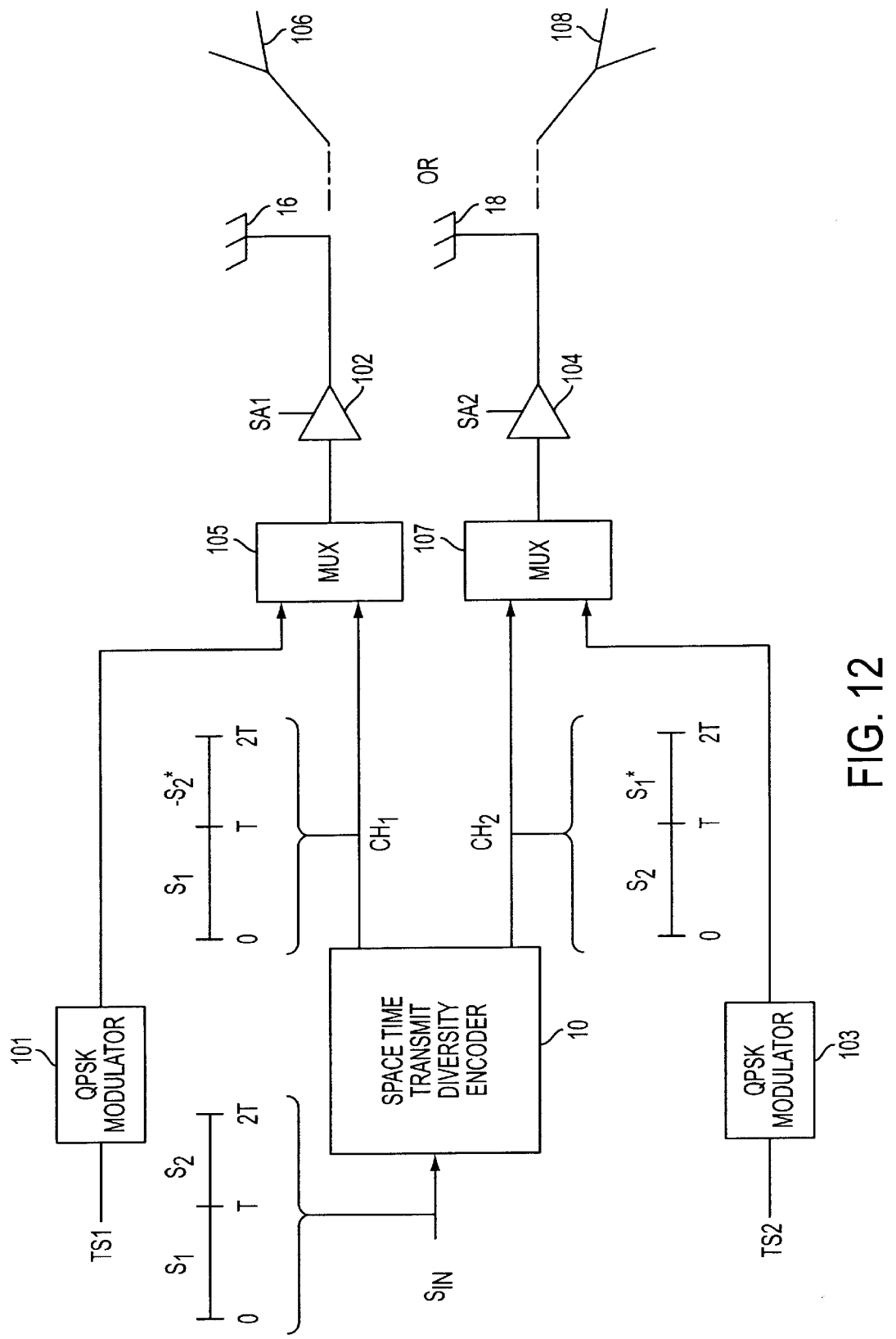
FIG. 12 is a block diagram of a TDMA base station apparatus according to another embodiment of the present invention.

In a fourth embodiment, the base station uses a time division multiple access (TDMA) transmitter instead of a spread spectrum CDMA transmitter. In FIG. 12, training sequence TS1 is modulated in QPSK modulator 101 and from there fed to a first input of multiplexer 105, and training sequence TS2 is modulated in QPSK modulator 103 and from there fed to a first input of multiplexer 107. Training sequences TS1 and TS2 are orthogonal and provide the means by which remote station 2 can discern between the beams in much the same was as pilot codes help distinguish beams in a CDMA system. In the TDMA system, multipliers 12 and 14 (of FIGS. 4, 5 and 11) are omitted and channel signals CH1 and CH2 are fed to second inputs to multiplexers 105 and 107, respectively. In this fourth embodiment amplifiers 102 and 104 independently amplify or attenuate the outputs of respective multiplexers 105 and 107. The outputs of amplifiers 102 and 104 are fed to the antenna system (through up converters, etc., not shown). The antenna system may provide the overlaid coverage of diversity antennas 16, 18 (FIG. 4) as in the first embodiment or may provide controlled directional coverage of directional antennas 106, 108 (FIGS. 5 and 11) as in the second and third embodiments. Moreover, in the case of controlled directional coverage, a variant may be to forego power management and omit amplifiers 102, 104 and rely on angle (beam) diversity by steering beams from directional antennas 106, 108. A data slot in a time division system may include, for example, 58 data bits followed by 26 bits of a training sequence followed by 58 data bits as in a GSM system. The training sequence identifies the source of signal $S_{IN}$ and the individual beam to remote station 2 so that the remote station can separately discern the beams. In this way, remote station 2 can separately receive the two beams using the training sequences, instead of using orthogonal spreading codes OC as in a CDMA system.

Although two beams are discussed, extensions to higher order coding techniques with more beams are straightforward. For example, four symbols ($S_1$, $S_2$, $S_3$, $S_4$) encoded into four channel signals (CH1, CH2, CH3, CH4) in four symbol time slots so that the original symbols are recoverable from the encoded channel signals. The four channel signals are then transmitted from the base station in four beams, each beam corresponding to a channel signal of the channel signals CH1, CH2, CH3, and CH4. Although QPSK modulation techniques are discussed herein, extensions to other PSK modulation techniques are straightforward, and extensions to other modulation techniques (e.g., QAM) are equally useable.

Figure 13:
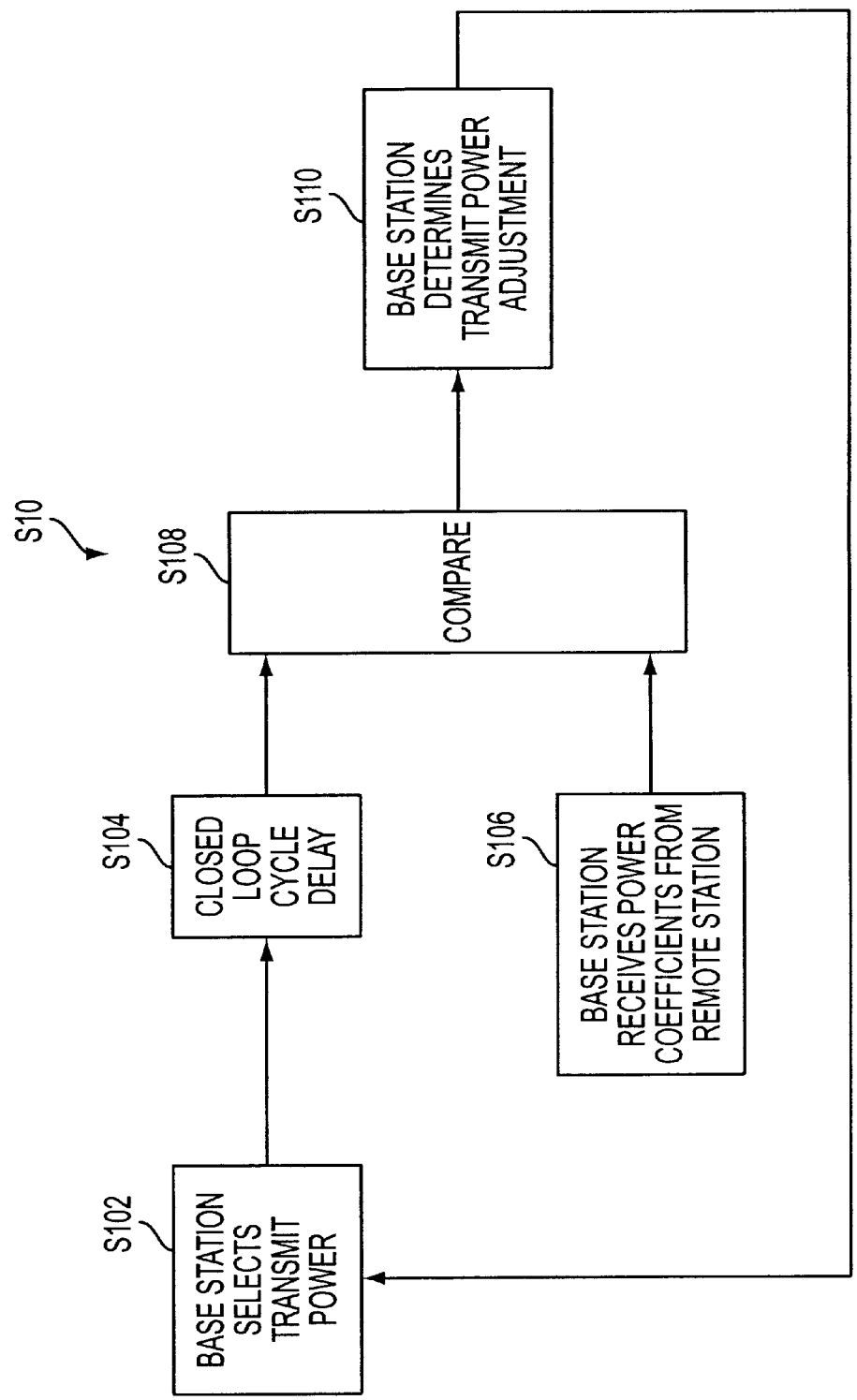
FIG. 13 is a block diagram of a closed loop beam power management system according to the present invention.

In FIG. 13, a closed loop control system to manage transmit powers is depicted as process S10. In step S102, the base station selects the power level to be transmitted from each antenna. For example, in a two antenna system, the base station selects powers P1 and P2 based on the total power (i.e., P1+P2) as defined by a conventional power control loop (e.g., a control loop typical to a CDMA system) and the relative powers (i.e., P1/P2) as defined by power control coefficients measured at remote station 2. In step S104, a value representing the selected transmit power level is sent to the remote station in a signaling channel. In step S106, the power level received at the remote station from each antenna radiation pattern is measured, and corresponding power control coefficients are determined. The power control coefficients for each antenna radiation pattern are determined at remote station 2 to be proportional to the received power at remote station 2 divided by the transmitted power as indicated by the power level value that is sent to the remote station in a signaling channel. In step 106 the power control coefficients are sent from the remote station to the base station in a signaling channel. In step S108, the power control coefficients from step S106 are compared for each antenna. In step S10, adjustments in transmit signal power are determined according to the comparision of step S108. The adjustments are made to increase transmit powers sent in channels that have favorable transmission qualities and reduce transmit powers in channels that have poor transmission qualities. Then, in step S102 at the begining of the cycle, the base station selects adjusted transmit powers to form the basis for the powers to be transmitted from the antennas during the next cycle of the closed loop beam power management. The loop cycle delay may be one time slot as in a third generation TDMA system.

Alternatively, the remote station may compare (in step S108) the power control coefficients for each antenna from step S106 and then compute power coefficient indicator information to be sent from the remote station to the base station in an up link signaling channel. For example, a ratio of the power control coefficients (e.g., P1/P2 in a two antenna case) may be advantageously computed as the power coefficient indicator information and transmitted in the up link direction. Or the power coefficient indicator information may be quantized value of the ratio (e.g., a single bit indicating whether P1>P2 or not).

Alternatively, in step S104, the selected transmit power is saved for a cycle time of the closed loop control system. For example, in a two antenna system, the base station selects powers P1 and P2 based on the total power (i.e., P1+P2) as defined by a conventional power control loop (e.g., a control loop typical to a CDMA system) and the relative powers (i.e., P1/P2) as defined by power control coefficients measured at remote station 2. In step S106, the power levels received at the remote station from each antenna radiation pattern are measured at remote station 2 and sent as power control coefficients in an up link signaling channel from remote station 2 to base station 1. The power control coefficients are normalized to their respective transmit powers as saved in step S104. In step S108, the normalized power control coefficients from step S106 are compared at the base station for each antenna. In step S110, adjustments in transmit signal power are determined according to the comparison of step S108. Then, in step S102 at the beginning of the cycle, the base station selects adjusted transmit powers to form the basis for the powers to be transmitted from the antennas during the next cycle of the closed loop beam power management.

Figure 14:
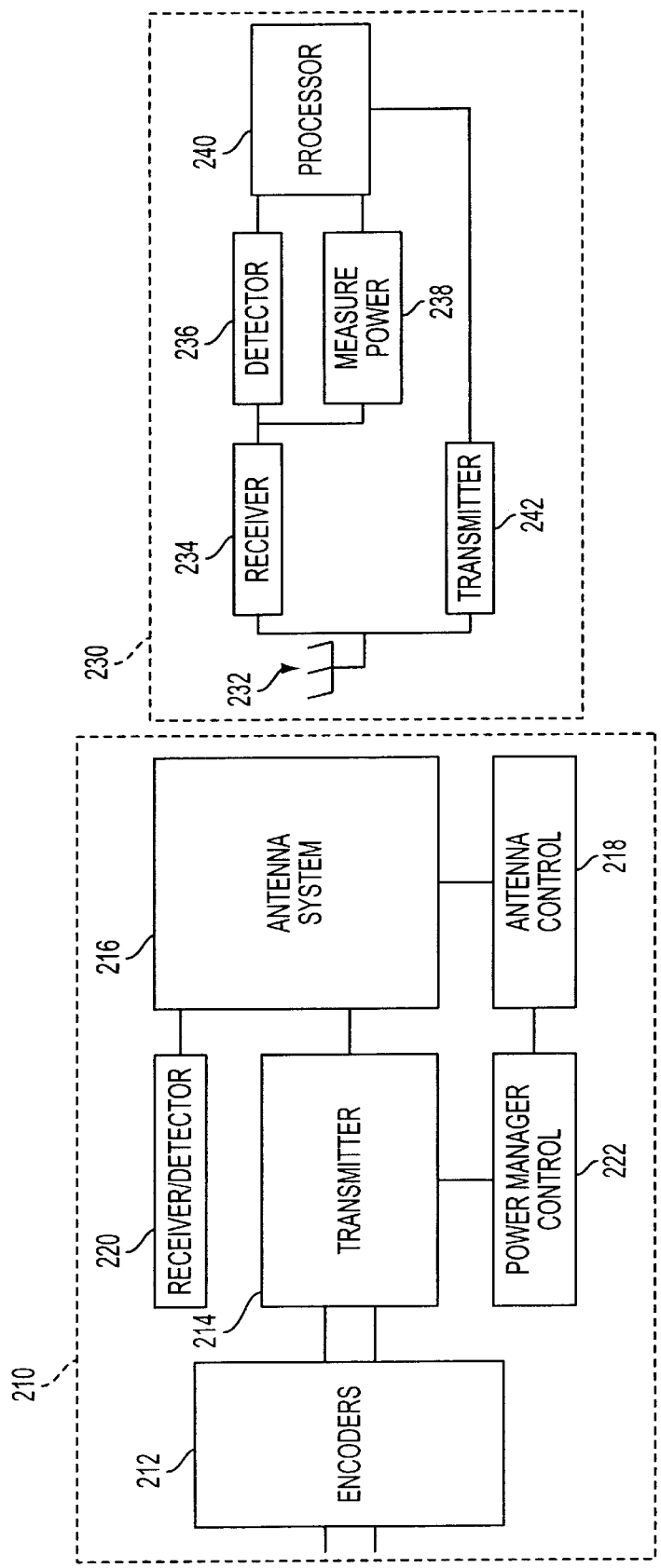
FIG. 14 is a block diagram of a radio system according the present invention.

In FIG. 14, a cellular radio system with closed loop beam power management controls includes base station 210 and remote station 230. Base station 210 includes space-time encoders 212 to encode a stream of symbols into first and second space-time coded signals, antenna system 216, transmitter 214 to transmit the first and second space-time coded signals at respective first and second initial transmit powers from the antenna system so as to form respective first and second radiation patterns, base station receiver 220 to receive power coefficient indicator information from the remote station, and power management controller 222 to determine first and second adjusted transmit powers based on the respective first and second initial transmit powers and the power coefficient indicator information.

Antenna system 216 may include plural antennas where each antenna is an antenna that generates either a substantially omni-directional radiation pattern or a radiation pattern directed to a sector. Omni-directional antennas are advantageously spaced apart. Antenna system 216 may form the first and second radiation patterns as orthogonal radiation patterns capable of being separately received at the remote station. Alternatively, transmitter 214 includes a circuit to process the first and second space-time coded signals so that the signals transmitted from the antenna system are orthogonal and can be separately received at the remote station.

Antenna system 216 is capable of generating plural beams (i.e., a multi-beam antenna) and the base station include antenna control 218 to control the multi-beam antenna to form the plural beams. In one embodiment, the multi-beam antenna may be a multi-port Butler matrix antenna, and in this case, transmitter 214 will include amplifiers to scale the first and second space-time coded signals to form respective first and second scaled space-time coded signals based on the respective first and second adjusted transmit powers, and antenna control 218 will include a switch to couple the first and second scaled space-time coded signals into respective first and second input ports of the Butler matrix antenna to form the respective first and second beams.

Alternatively, the multi-beam antenna includes a phased array antenna system, and antenna control 218 includes a beam steering controller to form first and second weighting functions. The beam steering controller includes logic to input the first and second weighting functions into the phased array antenna system to scale antenna gains of the respective first and second beams based on the respective first and second adjusted transmit powers without scaling amplifiers in transmitter 214. The phased array antenna system may include either a plural beam phased array antenna (e.g., 40 of FIG. 10) or plurality of phased array antennas (e.g., 20 of FIG. 7).

In some embodiments, the power coefficient indicator information includes first and second power control coefficients, and base station receiver 220 receives up link signaling information and detects values of the first and second power control coefficients in the up link signaling information.

Power management controller 222 includes a circuit (e.g., logic or a processor) to determine the first adjusted transmit power to be greater than the second adjusted transmit power when the indicated first path attenuation characteristic (or first power control coefficient) is less than the indicated second path attenuation characteristic (or second power control coefficient).

Remote station 230 includes remote station receiver 234, detector 236, power measurement circuit 238 and processor 240. Receiver 234, detector 236, power measurement circuit 238 and processor 240 constitute a circuit by which remote station 230 can determine an indicated path attenuation characteristic based on a power received from the first radiation pattern and measured in circuit 238 and an initial transmit power detected in signaling information in detector 236. With this circuit, remote station 230 can determine an indicated first path attenuation characteristic for a first radiation pattern of antenna system 216 and an indicated second path attenuation characteristic for a second radiation pattern of system 216 since the two radiation patterns are separately receivable. Receiver 234 receives down link signaling information, detector 236 detects a value of the initial transmit power in the down link signaling information, power measurement circuit 238 measures the power received from the radiation pattern, and processor 240 determines a power control coefficient to be proportional to the power received divided by the value of the initial transmit power. Power measurement circuit 238 measures an instantaneous power received, or in an alternative embodiment, measures an averaged power received, or in an alternative embodiment measures both and forms a combination of the instantaneous power received and the average power received. Remote station 230 further includes transmitter 242 to send values the power coefficient indicator information or of the indicated first and second path attenuation characteristics to the base station.

In a variant, processor 240 forms the power coefficient indicator information as a ratio of the indicated first path attenuation characteristic divided by the indicated second path attenuation characteristic. In an alternative variant, processor 240 forms the power coefficient indicator information with a first value when the indicated first path attenuation characteristic is less than the indicated second path attenuation characteristic and to form the power coefficient indicator information with a second value when the indicated first path attenuation characteristic is greater than the indicated second path attenuation characteristic.

In an exemplary embodiment, the base station transmits a first signal at first predetermined signal power P1 from the first antenna, and a receiver in remote station 2 determines first power control coefficient PCC1 to be a power received from the first antenna at the remote station. The base station also transmits a second signal at second predetermined signal power P2 from the second antenna, and a receiver in remote station 2 determines second power control coefficient PCC2 to be a power received from the second antenna at the remote station.

Both the first and second signals are transmitted simultaneously from respective first and second antennas in ordinary operation at their respective predetermined power levels. The transmit powers are distinguishable at remote station 2 by use of different orthogonal codes OC in multipliers 12 and 14 (FIGS. 4, 5 and 11) or by use of orthogonal training sequences as may be used in a TDMA base station (FIG. 12). The receiver in remote station 2 determines the signal power received from each antenna and transmits a value representing these received signal powers to the base station in a portion of the up link signaling data as separate power control coefficients PCC1 and PCC2 or as a relative power control coefficient PCC1/PCC2.

In a preferred embodiment, the base station first transmits signals in ordinary operation from the plural antennas at selected powers that may be unequal (S102). In one variant, the base station sends the power levels selected to be transmitted from each of the plural antennas in a down link signaling channel. The remote station (1) receives the base station's selected power levels (S104), (2) determines the signal powers received from the antennas (S106), and (3) compares the power transmitted from the base station from each antenna to the powers received at the remote station to determine the relative attenuations in the down link paths (S108) as the ratio of the received power to the corresponding transmitted power. The remote station sends this ratio determined for each antenna as power control coefficients back to the base station in the up link signaling data. Then, the base station adjusts the power allowed to be transmitted from the base station from each antenna according to the determined relative attenuations for all further down link transmissions (S110).

In another variant, (1) the remote station determines power control coefficients to be the signal powers received from the antennas (S106), and (2) the remote station sends the power control coefficients back to the base station in the up link signaling data. Then, the base station (1) adjusts for closed loop time delays in its receipt of the power control coefficients from remote station 2 (S104), (2) compares the power transmitted from the base station from each antenna to the power control coefficients received at the remote station to determine the relative attenuations in the down link paths (S108), and (3) adjusts the power allowed to be transmitted from the base station from each antenna according to the determined relative attenuations for all further down link transmissions (S110).

In either variant, the power allowed to be transmitted from an antenna will be greater for antennas associated with paths determined to posses a lesser path attenuation. For example, an indicated path attenuation characteristic is advantageously determined to be the ratio of the power received at remote station 2 to the power transmitted from base station 1. In this way, little or no power is transmitted in a path that is not well received by remote station 2, while a greater power is transmitted in a path that is well received by remote station 2. In many multi-path environments, increasing power transmitted in a path that has too much attenuation does little to improve reception at remote station 2, but such increased power would contribute to co-channel interference experienced by other remote stations. To improve the overall cellular radio system, the paths with the least attenuation are permitted the greatest transmit beam powers. The base station adjusts the power transmitted from each antenna by control scaling signals SA1 and SA2 (FIGS. 4 and 5) or by controlling the overall antenna gain for each beam by adjusting the amplitude parameters in control signal C (of FIG. 6) or in signals C1 and C2 (of FIG. 9).

In an embodiment of this closed loop method of power control, the remote station determines which antenna (or beam) is associated with the least attenuation path. The remote station sends an indication of which antenna (or beam) is favored (i.e., least attenuation) back to the base station in an up link signaling path. To conserve the number of bits sent in this up link signaling path, the remote station preferably determines the favored antenna and indicates this by a single bit (i.e., a "0" means antenna 16 is favored and a "1" means antenna 18 is favored, see FIG. 4). The base station receives this single bit indicator and applies it to determine a predetermined relative power balance. For example, it has been determined that applying 80% of full power to antenna 16 (e.g., when this is the favored antenna) and 20% of full power to antenna 18 consistently provides better performance than applying 100% of full power to antenna 16 and no power to antenna 18. Thus, the base station receives the single bit relative power indicator and selects the relative power P1/P2 for antennas 16 and 18 to be 80%/20% for a "1" indicator bit and 20%/80% for a "0" indicator bit.

In slowly varying radio environments, the coefficients (or any related channel information) can be parsed into segments, and the segments (containing fewer bits than the entire coefficient) can be sent to the base station in the up link signaling data using more up link time slots. Within a segment (perhaps plural TDMA time slots), the most significant bits are preferably transferred first, and these course values are gradually updated to be more precise using consecutive bits. Conversely, in rapidly varying radio environments, a special reserved signaling symbol may indicate the use of one or more alternative compressed formats for the up link transmission of the coefficients where an average exponent of all of the coefficients is transmitted (or presumed according to the signaling symbol) in the up link, and then only the most significant bits of the coefficients are then transmitted (i.e., truncating the less significant bits). In the extreme, only one bit is transmitted in the up link direction indicating that the power control coefficient is 1 (e.g., 80% of full power transmission) when the down link channel is good, and indicating that the power control coefficient is 0 (e.g., only 20% of full power transmission) when the associated channel is not adequate.

This closed loop control over beam power management is self adapting. If power control coefficients are up linked to the base station that cause over compensation in beam power, this closed loop control system will correct for this during the next closed loop control cycle. Persons skilled in the art will appreciate that other data compression techniques may be employed in the up link signaling to adjust to rapidly varying radio environments. Similarly, persons skilled in the art will appreciate that the remote station, not the base station, may compute commands to the base station to increase, or decrease, the power in specific beams.

In an alternative variant suitable for slowly varying radio environments, the first and second beams may be sequentially transmitted at their respective predetermined power levels in a calibration mode. In such a variant, only one beam is transmitted at a time so that the remote station need not employ orthogonal codes OC or orthogonal pilot signals to determine from which beam the received signal strength (e.g., power control coefficient) has been received. Once the channel attenuation is determined, signal $S_{IN}$ is sent using the beamspace time coding technique.

In addition to embodiments that rely on amplifiers 102 and 104 or beam gain in phase array antennas to control closed loop power management, another embodiment relies on angular diversity management and/or beam width management with the power management being omitted. Yet another embodiment relies on both the power management and either angular diversity management, beam width management, or both.

The performance of beamspace time coding techniques depends at least in part on angular spread AS that characterizes the radio environment and how the base station adapts the beams to match the angular spread. Down link performance is generally improved when the down link beams are directed at angles of arrival at which sharp peaks occur in an angular power spectrum of a signal from a remote station. The sharp peaks suggest good transmission along the indicated path (e.g., likely direction of paths 3 and 5). However, sharp peaks may not always be found. When the angular power spectrum is diffuse and sharp peaks cannot be found, an estimate of angular spread AS is made, and the plural beams used for down link transmissions are allocated to approximately cover the angular spread. In this way the down link transmission spatially matches the total channel as determined by the angular spread.

The circuit to measure the angular power spectrum includes receiver 220 (FIG. 14) and such signal and data processing circuitry as is required to determine the angular power spectrum and peaks therein as discussed below. When a peak in the angular power spectrum is detected, an angular position is defined by the peak. Then, to direct the beam direction toward an angular position as detected, antenna controller 218 computer an array steering vector to input into antenna system 216 (FIG. 14). When an excessive number of peaks are detected in the angular power spectrum, power management controller 222 (FIG. 14) selects the angular directions to be used to form beams. Power management controller 222 may select beams directions toward specific angle of arrival paths (i.e., peaks), or power management controller 222 may select beam directions, and possibly beam widths, so as to cover a detected angular spread. The selected directions are provided to antenna controller 218 to form the beam commands to the antenna system.

In systems using frequency division duplexing, the up link and down link transmissions take place at different frequencies. There is no guarantee that peaks measured in the up link power spectrum will occur at angle that correspond to angles with good transmission performance in the down link direction. However, by employing either angle diversity management or beam width management or both, there will be a greater likelihood of producing a good down link transmission.

Figure 18:
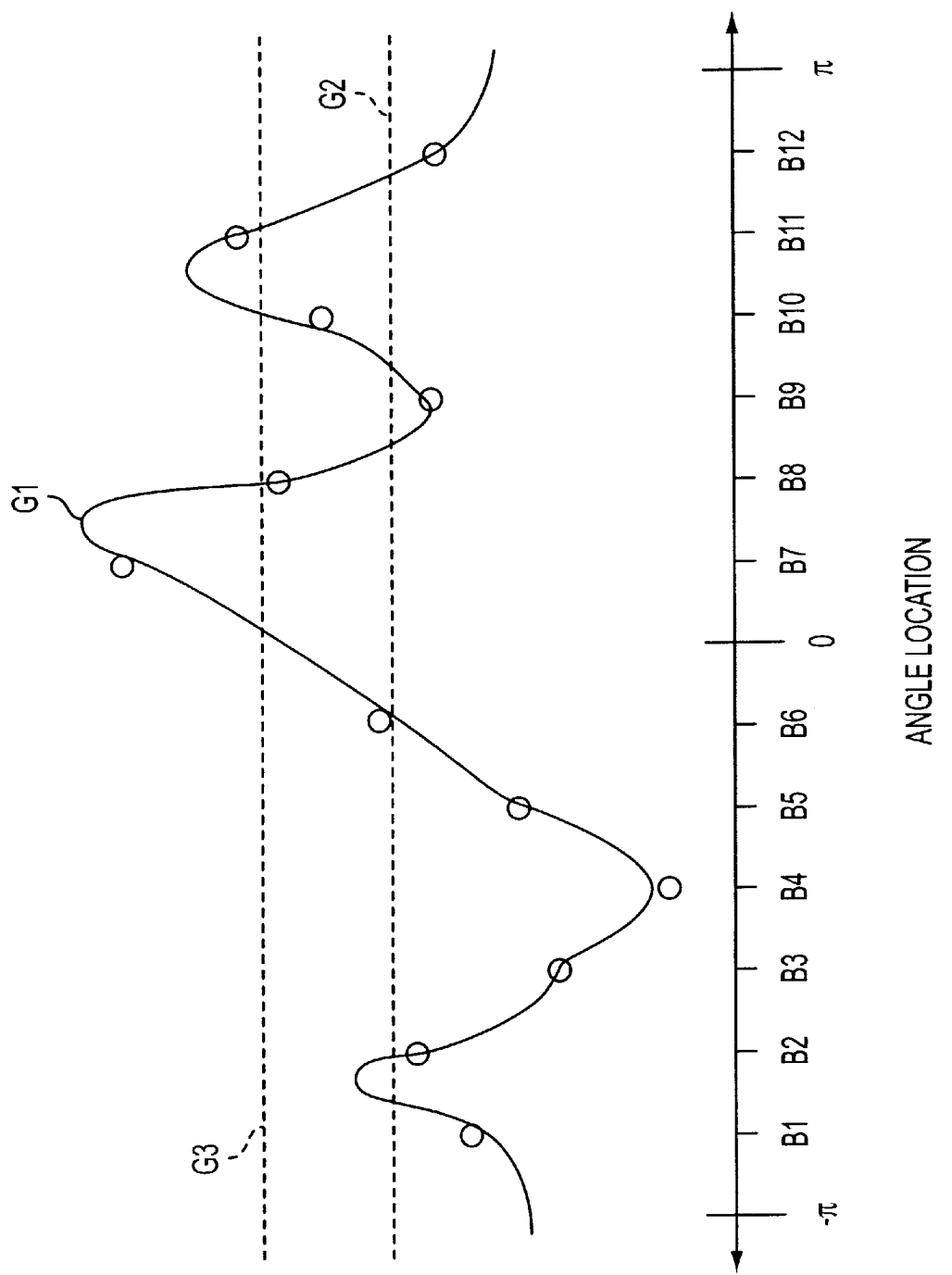
FIG. 18 is a graph of an angular power spectrum as received and/or computed by the present invention.

Both angular diversity and beam width management require a measurement of the angular power spectrum in one form or another. The remote station broadcasts an up link signal in its normal operation (e.g., signaling operation), the antenna system at the base station receives the signal, and the base station determines an angular power spectrum (i.e., a received power as a function of bearing angle in a plan view). FIG. 18 is a graph depicting the angular location of signal power received from remote station 2. In FIG. 18, discrete power measurements at each of 12 angular locations are shown based on, for example, twelve fixed location antenna beams pointed at 30 degree intervals in the antenna system for base station 1. The exemplary 12 beam antenna system may include three Butler matrix antennas, triangularly arranged, to form the 12 beam antenna system where each Butler matrix antenna forms four beams. While a 12 beam antenna system is considered in this example, it will be appreciated that any number of beams in an antenna system may be applied to the present invention (e.g., 24 beams, etc).

Alternatively, the antenna system may include three phased array antennas, triangularly arranged, to form an antenna system capable of forming the 12 beam where each phased array antenna forms a steerable beam with a beam width of 30 degrees so as to permit scanning over four beam positions. The 12 beam antenna system may also include 12 antennas of any type that have a 30 degree beam width and are angularly disposed at 30 degree increments around a 360 degree sector. While a 12 beam antenna system is considered in this example, it will be appreciated that any number of beams in an antenna system may be applied to the present invention (e.g., 24 beams, etc).

Figure 15:
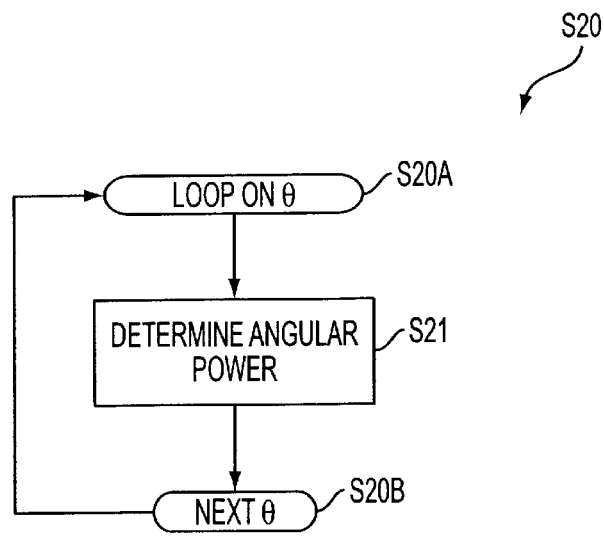
FIGS. 15–17 are flow charts of methods of determining the angular power spectrum according to the present invention.
Figure 16:
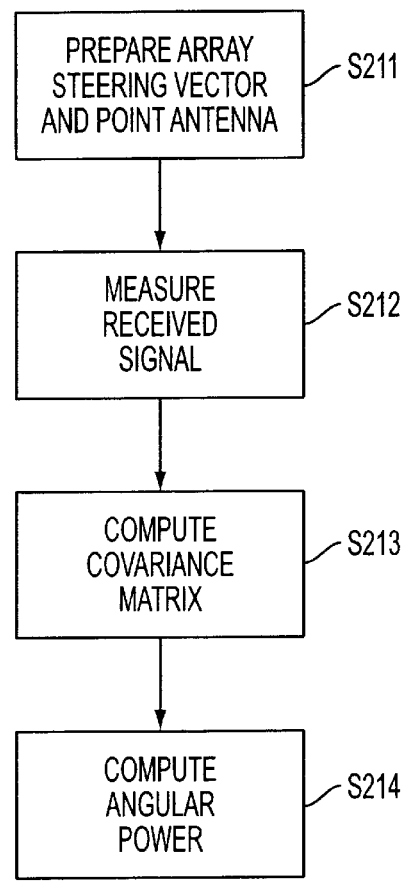

An antenna system based on a phased array antenna provides an opportunity to generate a more interpolated angular power spectrum (e.g., G1 of FIG. 18) by steering the antenna beam to point at as many angular positions as desired to generate the angular power spectrum. Power management controller 222 (FIG. 14) generates the angular power spectrum in process S20 (FIG. 15) by looping on θ in steps S20A and S20B and determining the angular power in step S21. Given the angle θ, power management controller causes antenna controller 218 (FIG. 14) to computer an array steering vector and point the antenna (step S211 of FIG. 16). The phased array antenna then receives a signal in receiver 220 (FIG. 14) from remote station 2 in each radiating element of the phased array antenna to form a signal vector in step S212 of FIG. 16. Each radiating element is preferably spaced apart from an adjacent element by one-half of the wavelength. For example, if a phased array antenna were to include 12 radiating elements (only 8 radiating elements are shown in antenna 20 of FIG. 7), the signal received in each of the 12 radiating elements would be sampled to form a measured signal vector. The sampled signal is preferably a complex value having amplitude and phase information. The signals from each of the 12 radiating elements are formed into a 12 element received signal vector as column vector $\hat{x}$. Next, the complex conjugate transpose of received signal vector $\hat{x}$ is formed as row vector $\hat{x}^H$, and the spatial covariance matrix of the received signal, $R=\hat{x}\hat{x}^H$, is calculated in step S213 (FIG. 16). When received signal vector $\hat{x}$ is 12 elements long, then the spatial covariance matrix of the received signal, $R=\hat{x}\hat{x}^H$, will be a 12 by 12 matrix.

Array steering vector $\bar{a}(\theta)$ is a column vector with one vector element for each radiating element of the phased array antenna. For example, if the phased array antenna were to include 12 radiating elements (e.g., half dipoles), array steering vector $\bar{a}(\theta)$ would include 12 vector elements. Array steering vector $\bar{a}(\theta)$ is constant C of FIG. 7, and it is used to point the beam of the phased array antenna toward bearing angle θ. Each vector element is given by:

$$\bar{a}_m(\theta) = \exp(-j \times k \times m \times d \times \sin\theta),$$

where k is 2π divided by the wavelength, m is an index from 0 to M (e.g., from 0 to 11 for a 12 element antenna) defining a number associated with the radiating element of the phased array antenna, d is the separation between radiating elements of the phased array antenna (preferably one-half of the wavelength) and θ is the bearing angle of the antenna beam formed.

Each vector element of array steering vector $\bar{a}(\theta)$ is a corresponding vector element of constant C as depicted in FIG. 7 so that the full vector combines to define an angle of arrival θ of the received signal in the receive beam, where θ is an angle with respect to a convenient reference direction of the phased array antenna. The complex conjugate transpose of array steering vector $\bar{a}(\theta)$ is row vector $\bar{a}(\theta)^H$.

The product, $\hat{x}\hat{x}^H\bar{a}(\theta)$, is still a column vector with one vector element for each radiating element of the phased array antenna. The product, $\bar{a}(\theta)^H\hat{x}\hat{x}^H\bar{a}(\theta)$, is a single point, a scalar, determined at step S214 (FIG. 16) to give the value of the angular power spectrum P(θ) at the angle of arrival θ. Thus, the angular power spectrum P(θ) is depicted in FIG. 18 at G1 and is computed to be:

$$P(\theta) = \bar{a}(\theta)^H \hat{x}\hat{x}^H \bar{a}(\theta)$$

where $\bar{a}(\theta)$ is an array steering vector, $\hat{x}$ is the received signal vector, $\hat{x}\hat{x}^H$ is the spatial covariance matrix of the received signal, and H denotes the complex conjugate transpose.

The above described equation for computing the array steering vector assumes the half wavelength spaced radiating elements are arrayed linearly. However, it will be appreciated by persons skilled in the art how to compute an array steering vector for radiating elements arrayed long a curved path. Three slightly "bowed out" antenna arrays may advantageously be employed in the antenna system depicted in FIG. 8. In fact, the antenna arrays may be severely "bowed out" so as to form a circle (e.g., FIG. 6). It will be appreciated by persons skilled in the art that computation of an array steering vector for such severely curved arrays of radiating elements will advantageously employ amplitude control as well as phase control in the array steering vector.

Figure 17:
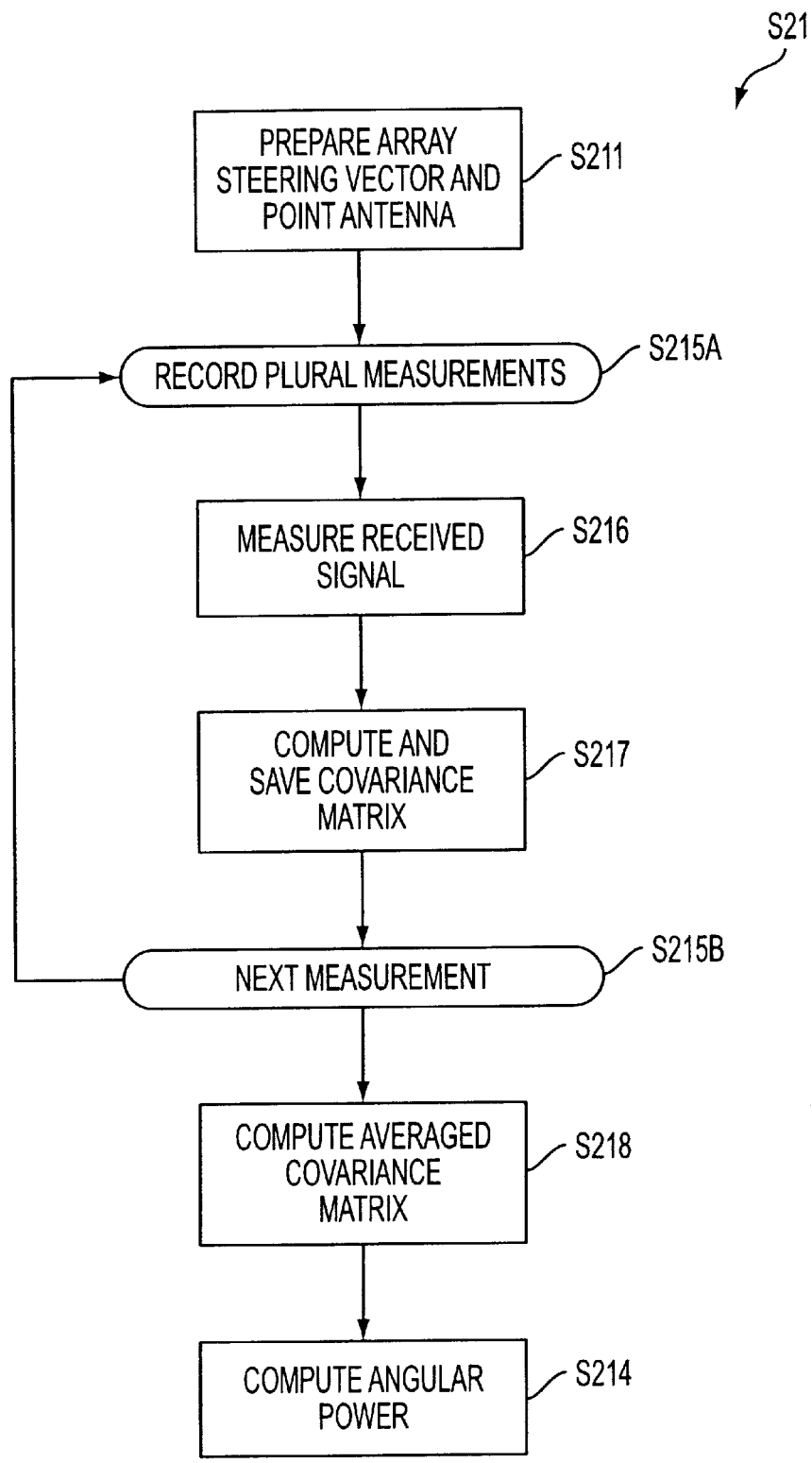

To provide improved performance the angular power spectrum is determined by averaging repeated measurements. In FIG. 17, the array steering vector is prepared and the antenna beam is pointed in step S211. The plural measurements are made by looping in steps S215A and S215B. Within this loop, received signal vector $\hat{x}$ is repeatedly measured in step S216 and the covariance matrix R is repeatedly determined and saved in step S217. Then, an average covariance matrix is determined in step S218, and angular power spectrum P(θ) is determined in step S214. This averaging determination is repeated several times over a time interval for each predetermined direction θ. In this way, fast fading phenomena are averaged out. The time period must be short enough that a mobile remote station 2 will not change position sufficiently to change the beam in which it is located during the averaging period. This time period, is preferably larger than the channel coherence time to average out fast fading effects. While the channel coherence time is not rigorously and universally defined, it may be taken to be proportional to and approximately equal to an inverse of the Doppler spread.

The Doppler spread is more rigorously defined. Due to a relative velocity between the base station and a mobile remote station, there will be a physical shift in the received frequency with respect to the transmitted frequency. The Doppler spread is twice this frequency shift. For example, the Doppler frequency shift is the ratio of the relative velocity to the wavelength (in like units, meters/second divided by meters or feet/second divided by feet, etc.). If a mobile remote station is traveling 13.9 meters/second (about 50 km/h) and the wavelength is about 0.15 meters (e.g., 2,000 MHz signal with the speed of light equal to 300,000,000 meters per second), then the Doppler frequency shift is 92.7 Hz, the Doppler spread is 185 Hz, and the channel coherence time is about 5.4 milliseconds. It can be easily verified that at a relative velocity of 40 meters per second (about 144 km/h) the channel coherence time is about 1.9 milliseconds, and that at a relative velocity of 1 meter per second (about 3.6 km/h) the channel coherence time is about 75 milliseconds.

The averaging time interval is preferably set to be greater than an inverse of the Doppler spread and less than a time in which a mobile station moving at an expected angular speed moves one-half of a beam width of the base station antenna system. The base station knows the remote station's range or can infer the range from signal strength. The base station is designed to communicate with mobile stations that can move at speeds up to a predetermined speed. This speed divided by the range may be taken to be the angular speed if the mobile station is moving radially around the base station. Setting the averaging interval to be a half beam width divided by the angular speed provides an estimate of the time in which a mobile remote station 2 will not change position sufficiently to change the beam in which it is located during the averaging period.

The time period over which the power P(θ) is averaged is usually much greater than the channel coherence time. For example, in a wide band CDMA system operating in an environment with a high incidence of multi-path reflections (e.g., urban environment), the average period could be tens of time slots. For indoor environments with a high incidence of multi-path reflections, the mobile is much slower and the averaging period can be much longer.

The base station computes the angular power spectrum and determines whether or not sharp peaks are indicated in the power spectrum. When sharp peaks are indicated, the angle location of each peak is determined. When the power spectrum is diffuse and no sharp peaks are indicated, the base station determines angular spread AS by first determining the angles at which the received angular power spectrum exceeds a predetermined threshold (G2 in FIG. 18). The threshold may also be adaptable based on the radio environment (e.g., signal density) detected by base station 1.

Sharp peaks in the angular power spectrum may be detected by, for example, using a two threshold test. For example, determine a first continuous angular extent (in degrees or radians) at which the power spectrum exceeds a first threshold G3. Then, determine a second continuous angular extent at which the power spectrum exceeds a second threshold G2 (lower than first threshold G3). When the ratio of the first angular extent divided by the second angular extent is less than a predetermined value, peaks are indicated.

When peaks are indicated, angle diversity management (i.e., the management of the direction of arrival of the beams) is invoked, and possibly beam width management is invoked. The sharpness of the spectral peaks may be determined by comparing the angular power spectrum against two thresholds. For example, in FIG. 18, three peaks exceed the threshold G2, but only two peaks exceed the threshold G3. The angular spread of a single peak determined according to threshold G2 is broader than the angular spread determined according to threshold G3. The ratio of the angular spread of the single peak determined by G3 as compared to the spread determined by G2 is a measure of the sharpness of the peak. Alternatively, the threshold against which the angular power spectrum is measured may be moved adaptively until there are at most two peaks in the angular power spectrum above the threshold to reveal the directions of paths 3 and 5. For example, when two sharp peaks occur in the angular power spectrum and the base station transmits two beams, the base station defines the direction of these peaks (i.e., the two distinct angular directions where the power spectrum exceeds threshold G3) to be the angular directions for paths 3 and 5 (FIG. 1). This is referred to as angle of arrival diversity. The base station points steerable beams, or selects fixed beams to point, along respective paths 3 and 5. Persons skilled in the art will appreciate how to extend angular diversity management to more than two beams.

On some occasions, the angular power spectrum includes three or more angular positions that correspond to respective peaks in the angular power spectrum. When the base station has two beams, the base station selects first and second angular positions from the three or more angular positions either (1) based on the avoidance of angles at which co-channel users are located so as to minimize co-channel interference on a system wide basis, or (2) so as to balance power distribution in amplifiers of the transmit station.

The beam widths in a phased array antenna are generally selectable by controlling an amplitude of elements in the beam steering vector (e.g., vector C of FIG. 7). When the antenna system includes a phased array antenna with controllable beam widths and the spectral peaks are sharp, the base station sets or selects beams to be as narrow as practical given the antenna system in order to concentrate the transmit power in directions along respective paths 3 and 5. Paths 3 and 5 are expected to have good transmission properties since the spectral power peaks are sharp.

On the other hand, when the angular power spectrum is so diffuse that peaks are weak or not indicated, a general angular window is determined based on the angular extent over which the power spectrum exceeds a threshold (e.g., G2 of FIG. 18) or at least the continuous angular extent needed to cover the peaks where the angular power spectrum exceeds the threshold. In such a case, preferred embodiments of the invention select beams such that the sum of the beam widths for all beams used for down link transmissions approximately equals angular spread AS.

When the antenna system includes a phased array antenna with controllable beam widths but the spectral peaks are not so sharp, the base station first determines the angular spread to be the angular extent of the power spectrum that is greater than a threshold or at least the continuous angular extent needed to cover the peaks where the angular power spectrum exceeds the threshold. Then, the base station sets or selects the beam widths for the beams to approximately cover the angular spread. This is referred to as angular power diversity or beam width management. For example, a two beam base station that seeks to cover the angular spread will select a beam width for both beams to be about half of the angular extent, and the base station points the two beams to substantially cover the angular spread.

Extensions to more beams are straightforward as will be appreciated by persons skilled in the art. For example, when the base station has capability for beamspace time encoding in a four beam base station, a beam width is selected for each beam that is approximately one-fourth of the angular spread. In this way the down link transmission will spatially match the channel. It is advantageous to match the coverage of orthogonal beams to the angular spread of the channel to obtain maximum angular diversity gain. However, usually two to four beams are adequate.

When the base station has an antenna system with plural fixed beams (as with a hex corner reflector antenna) and when the angular power spectrum is diffuse and angular spread AS exceeds the beam width of a single beam, a desirable variant of the invention combines two adjacent beams into a single broader beam (e.g., combine two 60 degree beams into a single 120 degree beam) to better match the radio channel. In such a case, the two adjacent beams are used as a single broader beam employing the same pilot code or orthogonalizing code. In fixed beam base stations, it is advantageous that the number of beams M that can be generated is large (e.g., M>4, and preferably at least 8) so that high beam resolution can be achieved. When a broader beam is needed to better match the channel, two adjacent beams may be combined.

The present invention fits well in a base station where the antenna system employs digital beam forming techniques in a phase array antenna (e.g., antenna 20 of FIG. 7 and antenna 40 of FIG. 10). With digital beam forming techniques, the apparent number elements in an antenna array (i.e., the apparent aperture dimension) can be electronically adjusted by using zero weighting in some of the elements according to the available angular spread. In this fashion, the beam width can be easily adapted by the base station to match the angular spread. This beam width control operates as an open loop control system.

In an alternative embodiment, beam hopping techniques are employed when the angular power spectrum exceeds the threshold in one large angular extent. A beam hopping technique is a technique that covers the angular spread sequentially. For example, when the transmit beams in any one time slot do not cover the angular spread, the angular spread may be covered during subsequent time slots. Consider an exemplary system that has a two beam base station capable of forming 30 degree beams where the angular spread covers 120 degrees (i.e., the width of four beams). In a beam hopping system, the base station forms two 30 degree beams for transmission during a first time slot so as to cover a first 60 degree sector of the 120 degree angular spread, and forms two other 30 degree beams for transmission during a second time slot so as to cover the remaining 60 degree sector of the 120 degree angular spread.

Beam hopping greatly improves performance in radio environments with large angular spreads. It is known that the down link performance degrades in frequency division duplex cellular radio systems when the angular spread becomes large, due at least in part to the increased angular uncertainty in the optimal selection of directions for transmission. In frequency division duplex systems, the up link directions determined to have good power transmission capacity (low attenuation) could be in a deep fade for a down link transmission due to the different carrier frequencies.

With a large angular spread in the radio environment, the number of possible directions for down link transmission will be large. Instead of selecting the two best directions, spatial diversity is achieved by sequentially forming down link beams to cover all of the potentially good directions where the angular power spectrum exceeds a threshold. This is particularly important in micro-cells or pico-cells where the angular spread can cover the whole sector or the whole cell.

In a scenario where remote station 2 is fixed or of low mobility, beam hopping has additional advantages over selection of the two strongest directions. When the best two directions are selected as the beam transmit directions for a large number of consecutive bursts, there is considerable penalty (in terms of loss of data) if the selected directions are a wrong choice (e.g., down link in deep fade even though up link is good). However, by hopping the beams over a group of potential directions, the loss of data from any one direction that turns out to be in deep fade will be for only a limited duration (e.g., only one time slot). This angular diversity tends to "whiten" the errors generated by selection of bad transmission directions.

Furthermore, the co-channel interference to other remote stations generated during beam hopping transmissions will tend to be whitened by the spatial spreading of the transmitted signal. Co-channel interference can be particularly troublesome when high data bit rate connections are required since high bit rate connections are achieved with high beam powers. The large amount of beam power involved in the high bit rate connection generates highly colored interference (not uniformly distributed) when a non-hopping scheme is employed by the base station for beam selection.

Having described preferred embodiments of a novel adaptive beam-time coding method and apparatus for down link performance enhancement (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. A method comprising steps of:
   encoding first and second symbols into first and second space-time coded signals;
   transmitting the first and second space-time coded signals in respective first and second radiation patterns at respective first and second initial transmit powers;
   determining power coefficient indicator information, wherein the step includes:
     receiving down link signaling information at a remote station;
     detecting a value of the first initial transmit power in the down link signaling information;
     measuring a first power received from the first radiation pattern at the remote station; and calculating a first power control coefficient to be proportional to the first power divided by the value of the first initial transmit power; and determining first and second adjusted transmit powers based on the respective first and second initial transmit powers and the power coefficient indicator information.

2. The method of claim 1, wherein the step of transmitting includes:

transmitting the first space-time coded signal in the first radiation pattern where the first radiation pattern is one of a substantially omni-directional radiation pattern and a radiation pattern directed to a sector; and transmitting the second space-time coded signal in the second radiation pattern where the second radiation pattern is one of a substantially omni-directional radiation pattern and a radiation pattern directed to a sector.

3. The method of claim 1, wherein the step of transmitting includes:

transmitting the first space-time coded signal from a first antenna; and transmitting the second space-time coded signal from a second antenna that is one of substantially spaced a part from the first antenna and polarized diversely from the first antenna.

4. The method of claim 1, wherein the step of transmitting includes processing the first and second space-time coded signals so that the signals transmitted are orthogonal signals capable of being separately received at a remote station.

5. The method of claim 4, wherein:

the step of transmitting is practiced on a code division multiple access transmit station; and the step of processing includes one of modulating the first and second space-time coded signals with orthogonal first and second spread spectrum codes and modulating the first and second space-time coded signals with orthogonal first and second pilot codes.

6. The method of claim 4, wherein:

the step of transmitting is practiced on a time division multiple access transmit station;

the step of processing the first and second space-time coded signals includes encoding orthogonal first and second training sequences into first and second training sequence signals;

the step of processing the first and second space-time coded signals further includes multiplexing the first training sequence signal with the first space-time coded signal to for m a first multiplexed signal and transmitting the first multiplexed signal; and the step of processing the first and second space-time coded signals further includes multiplexing the second training sequence signal with the second space-time coded signal to form a second multiplexed signal and transmitting the second multiplexed signal.

7. The method of claim 1, wherein:

the step of transmitting includes controlling a multi-beam antenna to form first and second beams;

the first radiation pattern includes the first beam; and the second radiation pattern includes the second beam.

8. The method of claim 7, wherein:

the multi-beam antenna includes a multi-port Butler matrix antenna;

the step of transmitting further includes scaling the first and second space-time coded signals to form respective first and second scaled space-time coded signals based on the respective first and second adjusted transmit powers; and the step of controlling a multi-beam antenna includes switching the first and second scaled space-time coded signals into respective first and second input ports of the Butler matrix antenna to form the respective first and second beams.

9. The method of claim 7, wherein:

the multi-beam antenna includes a phased array antenna system;

the step of controlling a multi-beam antenna includes forming first and second weighting functions in a beam steering controller; and the step of controlling a multi-beam antenna further includes inputting the first and second weighting functions into the phased array antenna system to scale the antenna gains of the respective first and second beams based on the respective first and second adjusted transmit powers, the phased array antenna system including one of a plural beam phased array antenna and a set of plural phased array antennas.

10. The method of claim 1, wherein:

the step of determining power coefficient indicator information includes determining an indicated first path attenuation characteristic based on a first power received from the first radiation pattern and the first initial transmit power;

the step of determining power coefficient indicator information further includes determining an indicated second path attenuation characteristic based on a second power received from the second radiation pat tern and the second initial transmit power; and the step of determining first and second adjusted transmit powers includes determining the first adjusted transmit power to be greater than the second adjusted transmit power when the indicated first path attenuation characteristic is less than the indicated second path attenuation characteristic.

11. The method of claim 1, wherein:

the power coefficient indicator information includes first and second power control coefficients;

the step of determining power coefficient indicator information includes receiving up link signaling information at a base station; and the step of determining power coefficient indicator information further includes detecting values of the first and second power control coefficients in the up link signaling information.

12. The method of claim 1, wherein the step of measuring a first power received includes measuring a power received from the first radiation pattern based on one of an instantaneous power received and an averaged power received and a combination of the instantaneous power received and the average power received.

13. The method of claim 1, wherein the step of determining power coefficient indicator information further includes a step of sending the first power control coefficient from the remote station to a base station.

14. The method of claim 1, wherein:

the step of detecting a value further detects a value of the second initial transmit power in the down link signaling information;

the step of measuring further measures a second power received from the second radiation pattern at the remote station;

the step of calculating further calculates a second power control coefficient to be proportional to the second power divided by the value of the second initial transmit power;

the step of determining power coefficient indicator information includes determining a ratio of the first power control coefficient divided by the second power control coefficient; and the step of determining power coefficient indicator information further includes a step of sending the ratio from the remote station to a base station as the power coefficient indicator information.

15. A method to control a transmit station comprising steps of:

determining an angular power spectrum wherein an angular spread includes at least three peaks in the angular power spectrum, wherein the step includes:
determining at least three angular positions corresponding to the respective at least three angular peaks; and selecting first and second angular positions from the at least three angular positions based on avoidance of angles at which co-channel users are located;

encoding first and second symbols in to first and second space-time coded signals; and transmitting the first and second space-time coded signals in respective first and second beams so that the first and second beams are contained within the angular spread of the angular power spectrum, the step including:
steering the first and second beams toward the respective first and second angular positions.

16. A method to control a transmit station comprising steps of:

determining an angular power spectrum, wherein an angular spread includes at least three angular peaks in the angular power spectrum and wherein the step includes:
determining at least three angular positions corresponding to the respective at least three angular peaks; and
selecting first and second angular positions from the at least three angular positions so as to balance power distribution in amplifiers of the transmit station;

encoding first and second symbols in to first and second space-time coded signals;

transmitting the first and second space-time coded signals in respective first and second beams so that the first and second beams are contained within the angular spread of the angular power spectrum, the step including:
steering the first and second beams toward the respective first and second angular positions.

17. A method to control a transmit station comprising steps of:

determining an angular power spectrum, the step including;
determining an angular spread to be a continuous angular extent over which values of the angular power spectrum exceed a threshold;

encoding first and second symbols in to first and second space-time coded signals; and transmitting the first and second space-time coded signals in respective first and second beams so that the first and second beams are contained within the angular spread of the angular power spectrum, wherein the step includes:
steering plural beams toward a plurality of respective angular positions such that the plural beams cover the angular spread.

18. The method of claim 17, wherein:
the angular spread includes first and second peaks in the angular power spectrum;

the step of determining an angular power spectrum includes determining first and second angular positions of the respective first and second peaks; and the step of transmitting includes a step of steering the first and second beams toward the respective first and second angular positions.

19. The method of claim 18, wherein the step of steering the first and second beams includes controlling a beam width of each of the first and second beams.

20. The method of claim 17 wherein the first and second beams cover the angular spread.

21. The method of claim 17, wherein the step of steering plural beams includes controlling a beam width of each of the plural beams.

22. The method of claim 17, wherein the step of transmitting the first and second space-time coded signals includes pointing the first and second beams so as to cover a first angular portion of the angular spread during a first time interval, the method further comprising steps of:

encoding third and fourth symbols into third and fourth space-time coded signals; and transmitting the third and fourth space-time coded signals in respective third and fourth beams so that the third and fourth beams cover a second angular portion of the angular spread during a second time interval.

23. The method of claim 17, wherein the step of determining an angular power spectrum includes:

receiving an up link signal;

processing the received up link signal to determine the angular power spectrum; and determining the angular spread from the angular power spectrum.

24. The method of claim 17, wherein the step of transmitting includes controlling a multi-beam antenna to form plural beams, the plural beams including the first and second beams.

25. The method of claim 24, wherein:

the multi-beam antenna includes a multi-port Butler matrix antenna;

the step of controlling a multi-beam antenna includes selecting first and second input ports of the Butler matrix antenna based on the angular spread; and the step of controlling a multi-beam antenna further includes switching the first and second space-time coded signals into the respective first and second matrix input sports to form the respective first and second beams.

26. The method of claim 24, wherein:

the multi-beam antenna includes a phased array antenna system;

the step of controlling a multi-beam antenna includes forming first and second weighting functions; and the step of forming first and second weighting functions includes inputting the first and second weighting functions into the phased array antenna system to at least one of point and shape the respective first and second beams, the phased array antenna system including one of a plural beam phased array antenna and a plurality of phased array antennas.

27. A method to control a transmit station comprising steps of: determining an angular power spectrum, the step including:

receiving an up link signal;

processing the received up link signal to determine the angular power spectrum, the step including:

determining $P(\theta)$ to be:

$$P(\theta)=\bar{a}(\theta)^H R \bar{a}(\theta)$$

where $\bar{a}(\theta)$ is an array steering vector, R is a spatial covariance matrix of the received signal, and H denotes the complex conjugate transpose; and determining an angular spread from the angular power spectrum; encoding first and second symbols in to first and second space-time coded signals; and transmitting the first and second space-time coded signals in respective first and second beams so that the first and second beams are contained within the angular spread of the angular power spectrum.

28. The method of claim 27, wherein the step of determining $P(\theta)$ includes computing R to be:

$$R=\hat{x}\hat{x}^H$$

where $\hat{x}$ is a measured signal vector, and H denotes the complex conjugate transpose.

29. A method to control a transmit station comprising steps of:

determining an angular power spectrum, the step including:
receiving an up link signal;
processing the received up link signal to determine the angular power spectrum, the step including:
determining $P(\theta)$ to be:

$$P(\theta)=\bar{a}(\theta)^H R_{AVG} \bar{a}(\theta)$$

where $\bar{a}(\theta)$ is an array steering vector, $R_{AVG}$ is an average spatial covariance matrix of the received signal, and H denotes the complex conjugate transpose; and determining the angular spread from the angular power spectrum; encoding first and second symbols in to first and second space-time coded signals; and transmitting the first and second space-time coded signals in respective first and second beams so that the first and second beams are contained within an angular spread of the angular power spectrum.

30. The method of claim 29, wherein the step of determining $P(\theta)$ includes:

measuring plural signal vectors;
computing plural matrices R, each matrix R corresponding to a respective signal vector and being computed to be:

$$R=\hat{x}\hat{x}^H$$

where $\hat{x}$ is a measured signal vector of the plural signal vectors, and H denotes the complex conjugate transpose; and computing $R_{AVG}$ to be an average of the plural matrices R.

31. The method of claim 30, wherein:
the plural signal vectors $\hat{x}$ are measured over a measurement time interval;
the measurement time interval is greater than an inverse of a Doppler spread; and
the measurement time interval is less than a time in which a mobile station moving at an expected angular speed moves one-half of a beam width of one of the first beam and the second beam.

32. A method to control a transmit station comprising steps of:

determining an angular power spectrum;
encoding first and second symbols in to first and second space-time coded signals; and
transmitting the first and second space-time coded signals in respective first and second beams so that the first and second beams are contained within an angular spread of the angular power spectrum, the step including:
controlling a multi-beam antenna to form plural beams, the plural beams including the first and second beams, wherein the multi-beam antenna is a phased array antenna with plural elements, the step including:
applying weights to signals fed to each element in the phased array antenna so that an apparent aperture width is controlled inversely to a desired beam width for each beam of the plural beams.

33. The method of claim 32, wherein the step of controlling a multi-beam antenna to for m plural beams further includes:

forming the first beam to have a first beam width;
forming the second beam to have a second beam width, the second beam width being unequal to the first beam width.

34. The method of claim 32, wherein the step of controlling a multi-beam antenna to form plural beams further includes forming the plural beams to have respective beam widths that aggregate to be substantially equal to the angular spread.

35. A system comprising a base station, wherein the base station includes:

a space-time encoder to encode a stream of symbols into first and second space-time coded signals;
an antenna system;
a transmitter to transmit the first and second space-time coded signals at respective first and second initial transmit powers from the antenna system so as to form respective first and second radiation patterns;
a base station receiver to receive power coefficient indicator information; and
a power management controller to determine first and second adjusted transmit powers based on the respective first and second initial transmit powers and the power coefficient indicator information; and
a remote station that includes a circuit to determine an indicated first path attenuation characteristic based on a first power received from the first radiation pattern and the first initial transmit power and to determine an indicated second path attenuation characteristic based on a second power received from the second radiation pattern and the second initial transmit power, wherein the circuit includes circuitry to form the power coefficient indicator information with a first value when the indicated first path attenuation characteristic is less than the indicated second path attenuation characteristic and to form the power coefficient indicator information with a second value when the indicated first path attenuation characteristic is greater than the indicated second path attenuation characteristic.

36. A system comprising a base station, wherein the base station includes:

a space-time encoder to encode a stream of symbols into first and second space-time coded signals;
an antenna system;

a transmitter to transmit the first and second space-time coded signals at respective first and second initial transmit powers from the antenna system so as to form respective first and second radiation patterns;

a base station receiver to receive power coefficient indicator information;

a power management controller to determine first and second adjusted transmit powers based on the respective first and second initial transmit powers and the power coefficient indicator information; and a remote station wherein the remote station includes:
circuitry to receive down link signaling information;
circuitry to detect a value of the first initial transmit power in the down link signaling information;
circuitry to measure the first power received from the first radiation pattern; and
circuitry to determine a first power control coefficient to be proportional to the first power divided by the value of the first initial transmit power.

37. The system of claim 36, wherein:
the antenna system includes first and second antennas; and
each antenna is an antenna that generates one of a substantially omni-directional radiation pattern and a radiation pattern directed to a sector.

38. The system of claim 36, wherein:
the antenna system includes first and second antennas; and
the first antenna is an antenna that is substantially spaced apart from the second antenna.

39. The system of claim 36, wherein the antenna system forms the first and second radiation patterns as orthogonal radiation patterns capable of being separately received at a remote station.

40. The system of claim 36, wherein the transmitter includes a circuit to process the first and second space-time coded signals so that the signals transmitted from the antenna system are orthogonal.

41. The system of claim 40, wherein the base station is a code division multiple access transmit station and the circuit to process the first and second space-time coded signals includes one of:
circuitry to modulate the first and second space-time coded signals with orthogonal first and second spread spectrum codes; and
circuitry to modulate the first and second space-time coded signals with orthogonal first and second pilot codes.

42. The system of claim 40, wherein:
the base station is a time division multiple access transmit station;
the circuit to process the first and second space-time coded signals includes a modulator to encode respective first and second training sequences into first and second training sequence signals;
the circuit to process the first and second space-time coded signals further includes a multiplexer to multiplex the first training sequence signal with the first space-time coded signal to form a first multiplexed signal; and
the circuit to process the first and second space-time coded signals further includes a multiplexer to multiplex the second training sequence signal with the second space-time coded signal to form a second multiplexed signal.

43. The system of claim 36, wherein:
the antenna system includes a multi-beam antenna;
the base station further includes circuitry to control the multi-beam antenna to form first and second beams;
the first radiation pattern includes the first beam; and
the second radiation pattern includes the second beam.

44. The system of claim 43, wherein:
the multi-beam antenna is a multi-port Butler matrix antenna;
the transmitter further includes amplifiers to scale the first and second space-time coded signals to form respective first and second scaled space-time coded signals based on the respective first and second adjusted transmit powers; and
the circuitry to control a multi-beam antenna includes a switch to couple the first and second scaled space-time coded signals into respective first and second input ports of the Butler matrix antenna to form the respective first and second beams.

45. The system of claim 43, wherein:
the multi-beam antenna includes a phase d array antenna system;
the circuitry to control a multi-beam antenna includes a beam steering controller to form first and second weighting functions; and
the beam steering controller includes logic to input the first and second weighting functions into the phased array antenna system to scale antenna gains of the respective first and second beams based on the respective first and second adjusted transmit powers, the phased array antenna system including one of a plural beam phased array antenna and a plurality of phased array antennas.

46. The system of claim 36, wherein:
the power coefficient indicator information includes first and second power control coefficients;
the base station receiver includes circuitry to receive up link signaling information; and
the base station receiver further includes circuitry to detect values of the first and second power control coefficients in the up link signaling information.

47. The system of claim 36, further comprising a remote station that includes a circuit to determine an indicated first path attenuation characteristic based on a first power received from the first radiation pattern and the first initial transmit power and to determine an indicated second path attenuation characteristic based on a second power received from the second radiation pattern and the second initial transmit power.

48. The system of claim 47, wherein the remote station further includes circuitry to send values of the indicated first and second path attenuation characteristics to the base station.

49. The system of claim 47, wherein the power management controller includes a circuit to determine the first adjusted transmit power to be greater than the second adjusted transmit power when the indicated first path attenuation characteristic is less than the indicated second path attenuation characteristic.

50. The system of claim 36, wherein the circuitry to measure the first power received measures one of an instantaneous power received and an averaged power received and a combination of the instantaneous power received and the average power received.

51. The system of claim 36, wherein:
the power coefficient indicator information includes the first power control coefficient; and
the remote station further includes circuitry to send the power coefficient indicator information to the base station.

52. The system of claim 36, wherein:
the circuitry to detect further detects a value of the second initial transmit power in the down link signaling information;
the circuitry to measure further measures the second power received from the second radiation pattern;
the circuitry to determine further determines a second power control coefficient to be proportional to the second power divided by the value of the second initial transmit power;
the circuit further includes circuitry to determine a ratio of the first power control coefficient divided by the second power control coefficient;
the power coefficient indicator information includes the ratio; and
the remote station further includes circuitry to send the as the power coefficient indicator information to the base station.

53. A system comprising a transmit station, wherein the transmit station includes:
a circuit to determine an angular power spectrum that includes:
circuitry to determine at least three angular positions corresponding to respective at least three angular peaks; and
circuitry to select first and second angular positions from the at least three angular positions based on avoidance of angles at which co-channel users are located;
a space-time encoder to encode first and second symbols into first and second space-time coded signals; and
a transmitter to transmit the first and second space-time coded signals in respective first and second beams so that the first and second beams are contained within an angular spread of the angular power spectrum, wherein the angular spread includes at least three peaks in the angular power spectrum, the transmitter including:
circuitry to steer the first and second beams toward the respective first and second angular positions.

54. A system comprising a transmit station, wherein the transmit station includes:
a circuit to determine an angular power spectrum that includes:
circuitry to determine at least three angular positions corresponding to respective at least three angular peaks; and
circuitry to select first and second angular positions from the at least three angular positions so as to balance power distribution in amplifiers of the transmit station;
a space-time encoder to encode first and second symbols into first and second space-time coded signals; and
a transmitter to transmit the first and second space-time coded signals in respective first and second beams so that the first and second beams are contained within an angular spread of the angular power spectrum, wherein the angular spread includes at least three angular peaks in the angular power spectrum and includes:
circuitry to steering the first and second beams toward the respective first and second angular positions.

55. A system comprising a transmit station, wherein the transmit station includes:
a circuit to determine an angular power spectrum that includes:
circuitry to determine the angular spread to be a continuous angular extent over which values of the angular power spectrum exceed a threshold;
a space-time encoder to encode first and second symbols into first and second space-time coded signals; and
a transmitter to transmit the first and second space-time coded signals in respective first and second beams so that the first and second beams are contained within an angular spread of the angular power spectrum the transmitter including:
circuitry to steer plural beams toward a plurality of respective angular positions such that the plural beams cover the angular spread.

56. The system of claim 55, wherein:
the angular spread includes first and second peaks in the angular power spectrum;
the circuit to determine an angular power spectrum includes circuitry to determine first and second angular positions of the respective first and second peaks; and
the transmitter includes circuitry to steer the first and second beams toward the respective first and second angular positions.

57. The system of claim 56, wherein the circuitry to steer the first and second beams includes a beam width controller.

58. The system of claim 55, wherein the first and second beams cover the angular spread.

59. The system of claim 55, wherein the circuitry to steer plural beams includes a beam width controller.

60. The system of claim 55, wherein:
the transmitter includes circuitry to point the first and second beams so as to cover a first angular portion of the angular spread;
the space-time encoder further encodes third and fourth symbols into third and fourth space-time coded signals;
the transmitter further includes circuitry to transmit the third and fourth space-time coded signals in respective third and fourth beams and to point the third and fourth beams so as to cover a second angular portion of the angular spread.

61. The system of claim 60, wherein the transmitter transmits the third and fourth space-time coded signals after the transmitter transmits the first and second space-time coded signals.

62. The system of claim 55, wherein the circuit to determine an angular power spectrum includes:
a receiver to receive up link signals; and
a processor to determine the angular power spectrum from the received up link signals and to determine the angular spread from the angular power spectrum.

63. The system of claim 62, wherein the processor includes circuitry to determine P(θ) to be:

$$P(\theta) = \bar{a}(\theta)^H R_{AVG} \bar{a}(\theta)$$

where $\bar{a}(\theta)$ is an array steering vector, $R_{AVG}$ is an average spatial covariance matrix of the received signal, and H denotes the complex conjugate transpose.

64. The system of claim 55, wherein the transmitter includes:
a multi-beam antenna; and
circuitry to control the multi-beam antenna to form plural beams, the plural beams including the first and second beams.

65. The system of claim 64, wherein:

the multi-beam antenna includes a multi-port Butler matrix antenna;

the circuitry to control a multi-beam antenna includes logic to select first and second input ports of the Butler matrix antenna based on the angular spread; and the circuitry to control a multi-beam antenna further includes a switch to couple the first and second space-time coded signals into the respective first and second input ports to form the respective first and second beams.

66. The system of claim 64, wherein:

the multi-beam antenna includes a phased array antenna system;

the circuitry to control a multi-beam antenna includes a beam steering controller to form first and second weighting functions; and the beam steering controller includes logic to input the first and second weighting functions into the phased array antenna system to at least one of point and shape the respective first and second beams, the phased array antenna system including one of a plural beam phased array antenna and a plurality of phased array antennas.

67. A system comprising a transmit station, wherein the transmit station includes:

a circuit to determine an angular power spectrum that includes:

a receiver to receive up link signals; and a processor to determine the angular power spectrum from the received up link signals and to determine an angular spread from the angular power spectrum wherein the processor includes circuitry to determine $P(\theta)$ based on:

$$P(\theta) = \bar{a}(\theta)^H R \bar{a}(\theta)$$

where $\bar{a}(\theta)$ is an array steering vector, R is a spatial covariance matrix of the received signal, and H denotes the complex conjugate transpose;

a space-time encoder to encode first and second symbols into first and second space-time coded signals; and a transmitter to transmit the first and second space-time coded signals in respective first and second beams so that the first and second beams are contained within the angular spread of the angular power spectrum.

68. The system of claim 67, wherein the circuitry to determine $P(\theta)$ includes logic to compute R to be:

$$R = \hat{x}\hat{x}^H$$

where $\hat{x}$ is a measured signal vector, and H denotes the complex conjugate transpose.

69. A system comprising a transmit station, wherein the transmit station includes:

a circuit to determine an angular power spectrum wherein the circuit to determine an angular power spectrum includes:

a receiver to receive up link signals; and a processor to determine the angular power spectrum from the received up link signals and to determine an angular spread from the angular power spectrum, wherein the processor includes circuitry to determine $P(\theta)$ to be:

$$P(\theta) = \bar{a}(\theta)^H R_{AVG} \bar{a}(\theta)$$

where $\bar{a}(\theta)$ is an array steering vector, $R_{AVG}$ is an average spatial covariance matrix of the received signal, and H denotes the complex conjugate transpose, and wherein the circuitry to determine $P(\theta)$ includes:

circuitry to measure plural signal vectors;

logic to compute plural matrices R, each matrix R corresponding to a respective signal vector and being computed to be:

$$R = \hat{x}\hat{x}^H$$

where $\hat{x}$ is a measured signal vector of the plural signal vectors, and H denotes the complex conjugate transpose; and logic to compute $R_{AVG}$ to be an average of the plural matrices R;

a space-time encoder to encode first and second symbols into first and second space-time coded signals; and a transmitter to transmit the first and second space-time coded signals in respective first and second beams so that the first and second beams are contained within the angular spread of the angular power spectrum.

70. The system of claim 69, wherein:

the plural signal vectors $\hat{x}$ are measured over a measurement time interval;

the measurement time interval is greater than an inverse of a Doppler spread; and the measurement time interval is less than a time in which a mobile station moving at an expected angular speed moves one-half of a beam width of one of the first beam and the second beam.

71. A system comprising a transmit station, wherein the transmit station includes:

a circuit to determine an angular power spectrum;

a space-time encoder to encode first and second symbols into first and second space-time coded signals; and a transmitter to transmit the first and second space-time coded signals in respective first and second beams so that the first and second beams are contained within an angular spread of the angular power spectrum, the transmitting including:

a multi-beam antenna; and circuitry to control the multi-beam antenna to form plural beams, the plural beams including the first and second beams, wherein the multi-beam antenna is a phased array antenna with plural elements, and wherein the circuitry includes:

a beam steering controller to apply weights to signals fed to each element in the phased array antenna so that an apparent aperture width is controlled inversely to a desired beam width for each beam of the plural beams.

72. The system of claim 71, wherein the circuitry to control a multi-beam antenna to form plural beams further includes:

logic to form the first beam to have a first beam width;

logic to form the second beam to have a second beam width, the second beam width being unequal to the first beam width.

73. The system of claim 71, wherein the circuitry to control a multi-beam antenna to form plural beams further includes logic to form the plural beams to have respective beam widths that aggregate to be substantially equal to the angular spread.

* * * * *

UNITED STATES PATENT AND TRADEMARK OFFICE
CERTIFICATE OF CORRECTION

PATENT NO. : 6,788,661 B1
DATED : September 7, 2004
INVENTOR(S) : Juha Ylitalo et al.

It is certified that error appears in the above-identified patent and that said Letters Patent is hereby corrected as shown below:

Title page,
Item [73], Assignee, please replace "Nikia" with -- Nokia --
Item [56], References Cited, OTHER PUBLICATIONS, "Heath, R. W., Jr. et al." reference, please replace "1999 Int'l." with -- 1999 IEEE Int'l. --
Item [74], *Attorney, Agent, or Firm*, please replace "Wincoff" with -- Witcoff --

Column 24,
Line 47, please replace "sports" with -- ports --

Signed and Sealed this

Twenty-first Day of June, 2005

JON W. DUDAS
*Director of the United States Patent and Trademark Office*